United States Patent [19]

Calle et al.

[11] 4,017,839
[45] Apr. 12, 1977

[54] INPUT/OUTPUT MULTIPLEXER SECURITY SYSTEM

[75] Inventors: Jaime Calle, Glendale; V. Michael Griswold, Phoenix, both of Ariz.

[73] Assignee: Honeywell Information Systems, Inc., Waltham, Mass.

[22] Filed: June 30, 1975

[21] Appl. No.: 591,563

[52] U.S. Cl. ............................................. 340/172.5
[51] Int. Cl.² ...................... G06F 9/18; G06F 3/00
[58] Field of Search ................................ 340/172.5

[56] References Cited

UNITED STATES PATENTS

| | | | |
|---|---|---|---|
| 3,263,218 | 7/1966 | Anderson | 340/172.5 |
| 3,328,768 | 6/1967 | Amdahl | 340/172.5 |
| 3,447,135 | 5/1969 | Calta | 340/172.5 |
| 3,530,438 | 9/1970 | Mellen | 340/172.5 |
| 3,562,717 | 2/1971 | Harmon | 340/172.5 |
| 3,815,101 | 6/1974 | Boss | 340/172.5 |
| 3,839,706 | 10/1974 | Borchsenius | 340/172.5 |
| 3,845,425 | 10/1974 | Clements | 340/172.5 |

*Primary Examiner*—James D. Thomas
*Attorney, Agent, or Firm*—Faith F. Driscoll; Nicholas Prasinos; Ronald T. Reiling

[57] ABSTRACT

An input/output processing system includes a plurality of active modules, a plurality of passive modules, at least one memory module and a system interface unit having a plurality of ports, each of which connect to a different one of the modules. The active modules include an input/output processing unit which processes interrupts and executes command signals and at least one multiplexer unit which directly controls transfers between the memory module and any one of a plurality of peripheral devices coupled to different ports of the multiplexer unit. The system interface unit operatively provides connections between different ones of the modules during the execution of commands included within user programs. The multiplexer unit includes sets of registers selectable under program control which store information which enables user programs for accessing the memory module. Additionally, other ones of these registers store control information used to control the processing of interrupts as well as other operations independently of user programs. The multiplexer unit includes apparatus which operatively couples these registers and is responsive to commands to ensure that only authorized acceses to these registers are made during system operation. The system also provides access rights to those registers to different types of system software such that only the system routines having the appropriate privileges are able to transfer information to those registers within the multiplexer unit.

25 Claims, 26 Drawing Figures

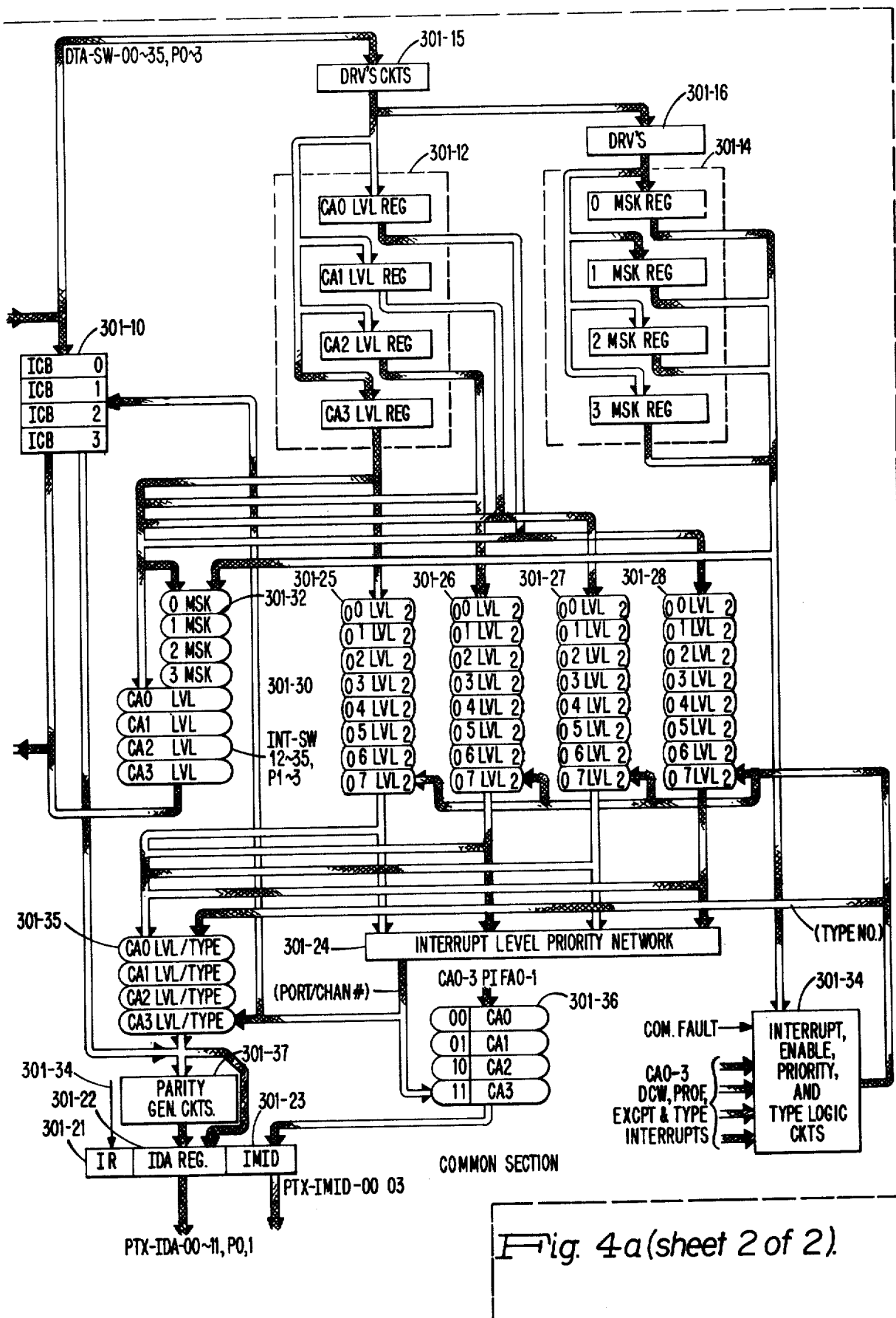
Fig. 4a (sheet 2 of 2).

WORD 0
IO = CONTROL WORD TYPE (IO=DCW)
M = DATA TRANSFER MODE
   2(1) = REVERSE; 2(0) = FORWARD
   3(1) = NO XFER; 3(0) = TRANSFER
   4(1) = DISCONNECT; 4(0) = PROCEED
IC = INTERRUPT CONTROL
   5(1) = INT. (EMBEDDED DCW); 5(0) = NO INTERRUPT
   6(1) = WAIT IF INT. REQ. ON; 6(0) = DO NOT WAIT
LA = ENABLE LOOK AHEAD
T1 = 1 WORD TALLY FLAG

WORD 1
L/R = LOCAL/REM MEMORY MOD
S = STEERING MEM.
1 = MPX CATEGORY
IBP = INITIAL BYTE POSITION
   (IGNORED BY HSMX)

| | DATA WORD | | | | REG # OCTAL |
|---|---|---|---|---|---|
| | 0 | 9 | 18 | 27 35 | |
| INTERRUPT MASKS | | | | INT. MASKS | *000 |
| INTERRUPT CONTROL | ☒ ICBD | | LT0 LT1 LT2 | LT3 LT4 LT5 LT6 LT7 | *001 |
| DATA ADDRESS | DATA ADDRESS | | | | *003 |
| DATA TALLY/CONTROL | DATA CONTROL | | DATA TALLY | | *007 |
| LPW | LPW | | | | *013 |
| CHNL-D-REG-0 | CH-D0 | | | | 020 |
| CHNL-D-REG-1 | CH-D1 | | | | 021 |
| CHNL-D-REG-2 | CH-D2 | | | | 022 |
| CHNL-D-REG-3 | CH-D3 | | | | 023 |
| CHNL-MODE | CH-MODE | | | | 025 |
| CA-MODE | | CA-MODE | | | 026 |
| CHNL/CA-MODE | CH-MODE | CA-MODE | | | 027 |
| WRITE DATA REG 0,1 | W-REG 0,1 | | | | 033 |
| OUT-REG-ZAC | OUTPUT REG ZAC | | | | *042 |
| OUT-REG-PID | OUTPUT REG PI-DATA | | | | *046 |
| OUT-REG-DATA | OUTPUT REG DATA WD1 | | | | *052 |
| OUT-REG-DATA | OUTPUT REG DATA WD 2 | | | | *056 |

\* PRIVILEGED REGISTER

Fig. 7d.

| | DATA WORD | | | | REG # OCTAL |
|---|---|---|---|---|---|
| | 0 | 9 | 18 | 27 35 | |
| INTERRUPT CONTROL | PN ICBD | | LT0 LT1 LT2 | LT3 LT4 LT5 LT6 LT7 | 001 |
| PI COMMAND | PI-COMMAND | | | | 002 |
| DATA ADDRESS | DATA ADDRESS | | | | 003 |
| CHANNEL CONTROL | CHANNEL CONTROL | | | | 006 |
| DATA TALLY/CONTROL | DATA CONTROL | | DATA TALLY | | 007 |
| MEMORY DATA (H) | H-REGISTER | | | | 012 |
| LPW | LPW | | | | 013 |
| CHNL-D-REG-0 | CH-D0 | | | | 020 |
| CHNL-D-REG-1 | CH-D1 | | | | 021 |
| CHNL-D-REG-2 | CH-D2 | | | | 022 |
| CHNL-D-REG-3 | CH-D3 | | | | 023 |
| MODE REGISTER | CHANNEL | ADAPTER | ZERO | | 024 |
| CHANNEL STATUS | CHANNEL STATUS & CONTROL | | | | 034 |
| OUT-REG-ZAC | OUTPUT REG ZAC | | | | 042 |
| OUT-REG-PID | OUTPUT REG PI-DATA | | | | 046 |
| OUT-REG-DATA | OUTPUT REG DATA WD1 | | | | 052 |
| OUT-REG-DATA | OUTPUT REG DATA WD 2 | | | | 054 |

Fig. 7e.

INPUT/OUTPUT MULTIPLEXER SECURITY SYSTEM

RELATED APPLICATIONS

1. "Programmable Interface Apparatus and Method" invented by Garvin Wesley Patterson, William A. Shelly, Jaime Calle and Earnest M. Monahan, filed on even date herewith, Ser. No. 562,364 and assigned to the same assignee named herein.

2. "A Pathfinder Microprogram Control Store" invented by Garvin Wesley Patterson and Marion G. Porter, filed on even date herewith, Ser. No. 562,363 and assigned to the same assignee as named herein.

3. "Steering Code Generating Apparatus For Use In An Input/Output Processing System" invented by Garvin Wesley Patterson, William A. Shelly and Earnest M. Monahan, filed on even date herewith, Ser. No. 562,362 and assigned to the same assignee as named herein.

4. "Priority Interrupt Mechanism" invented by Earnest M. Monahan, Garvin Wesley Patterson and Jaime Calle, filed on even date herewith, Ser. No. 562,315 and assigned to the same assignee named herein.

5. "Dispatcher Mechanism" invented by Earnest M. Monahan and Garvin Wesley Patterson, filed on even date herewith, Ser. No. 562,314 and assigned to same assignee named herein.

6. "Fail Soft Memory" invented by Marion G. Porter, Jaime Calle, and Garvin Wesley Patterson, filed on even date herewith, Ser. No. 562,361 and assigned to same assignee as named herein.

7. "Instruction Look Ahead Having Prefetch Concurrency and Pipeline Features" invented by Marion G. Porter, filed on even date herewith, Ser. No. 562,272 and assigned to same assignee named herein.

8. "Data Alignment Circuit" invented by Darrell L. Fett, filed on even date herewith, Ser. No., 559,115 and assigned to same assignee as named herein.

9. "Processor for Input/Output Processing System" invented by Marion G. Porter, Garvin Wesley Patterson, William A. Shelly and Nicholas S. Lemark, filed on even date herewith, Ser. No. 562,317 and assigned to same assignee as named herein.

10. "Method of Generating Addresses to a Paged Memory" invented by Garvin Wesley Patterson and Marion G. Porter, filed on even date herewith, Ser. No. 562,330.

11. "Memory Steering in a Data Processing System" invented by William A. Shelly, filed on even date herewith, Ser. No. 562,313.

BACKGROUND OF THE INVENTION

1. Field of Use

The present invention relates to data processing systems and more particularly to input/output systems required to control input/output data transfer operations involving peripheral devices.

2. Prior Art

In general, many systems have provided for limiting the access of various subsystems to specific portions of a system's memory. For example, it is necessary in a multiprogramming environment to ensure that a supervisory or executive program does not have its data altered or destroyed or accessed by a user or slave program. Thus, for the most part, these types of systems have been concerned primarily with protecting memory from accesses which would result in the inadvertent destruction of valuable programming data.

Other types of systems found it necessary in addition to providing protection of data and programs from destruction to secure them against improper use and disclosure. In general, these types of systems have relied primarily upon the operating system "software" to ensure system security. While systems of these types provide a high degree of security, the systems are considerably sophisticated and costly. Furthermore, in such systems, it may still be possible for a user program through incorrect calculations or existing flaws in input-output routines to gain access to information to which it should not have access thereby rendering the system insecure and system information unprotected.

Accordingly, it is the primary object of the present invention to provide input-output processing system which protects against unauthorized access to information stored within different modules of a system.

It is a further object of the present invention to provide a system which automatically prevents unauthorized access to registers of input/output control devices of a system.

It is still a further object of the present invention to provide apparatus for use in an input/output system for ensuring that user programs being executed by the input/output system only access information to which they are allowed access.

SUMMARY OF THE INVENTION

The above objects are achieved according to the present invention by including in certain ones of the control modules and units which comprise the input-/output system, apparatus for verifying whether the program accessing information within that module is to be granted access.

In a preferred embodiment of the system which includes the apparatus of the present invention, each module connects to a different one of a number of ports of a system interface unit. Each such port of certain ones of the modules include a programmable interface in addition to the normal type interfaces. The modules include an input/output processing unit which issues commands on the programmable interface to other modules including at least one multiplexer unit for causing the unit to load or unload information into and from any one of a plurality of registers included therein which operatively couple to the programmable interface and are used during the performance of input/output operations.

In the preferred embodiment, each of the plurality of registers include a number of registers for storing control information used in processing interrupts received from the devices connected to the multiplexer unit. Other ones of the registers store address information used for accessing the memory modules of the system. Still other registers store control information referenced by system routines during other than normal operations such as maintenance and diagnostic operations.

Also, in the preferred embodiment of the present invention, the various system routines are assigned different access permissions required for loading or unloading the different registers of the multiplexer unit by the programmable interface. By assigning different system routines different access rights, the apparatus included within the multiplexer unit is able to ensure that only the appropriate module has access to a given register thereby increasing the overall system security. In those instances where a system routine or user program attempts to access a register improperly, the apparatus of a multiplexer unit inhibits access or modification of the register contents and in turn conditions control apparatus included therein to generate an interrupt signaling the attempted access.

Additionally, in the arrangement of the preferred embodiment, all control routines which execute input/output operations in response to user programs are supplied the necessary information for loading or unloading the contents of different ones of the registers of a multiplexer unit. Such input/output routines are required to call a further control routine having greater access rights and request it to load the register contents. At that time, the control routine as part of the call is required to identify itself and the operation by identifying one of a number of peripheral transaction tables which store memory pointers for referencing a memory module. This ensures that the information loaded into any one of the registers via the programmable interface proceeds properly. Moreover, only the prograam which has proper authorization to load control information into a register is able to load that register.

The novel features which are believed to be characteristic of the invention both as to its organization and method of operation, together with further objects and advantages, will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 4c and 4d show in greater detail different embodiments of a portion of the control circuits of FIG. 4a.

FIG. 7d illustrates a number of the different load register commands used in connection with multipexer 300 of FIG. 1.

FIG. 7e illustrates a number of the different read register commands used in connection with multiplexer 300 of FIG. 1.

TABLE OF CONTENTS

Description of the Preferred Embodiment
  General Description
  The Port Interfaces
  Data Interface Lines
  Programmable Interface Lines
  Interrupt Interface Lines
  Local Memory Interface Lines
  Detailed Description of Input/Output Processor 200
  Control Store Section 201
  Instruction Buffer Section 202
  Storage Section 203
  Processing Section 204
  Detailed Description of System Interface Unit 100
    Interrupt Section 102
    Data Transfer Section 102
  Detailed Description of High Speed Multiplexer 300
  Common Section
  Channel Adapter Sections
  Controller Adapter Lines
  Detailed Description of Sections 301-4 and 301-34
Description of Operation

DESCRIPTION OF THE PREFERRED EMBODIMENT

General Description

Figure 1:
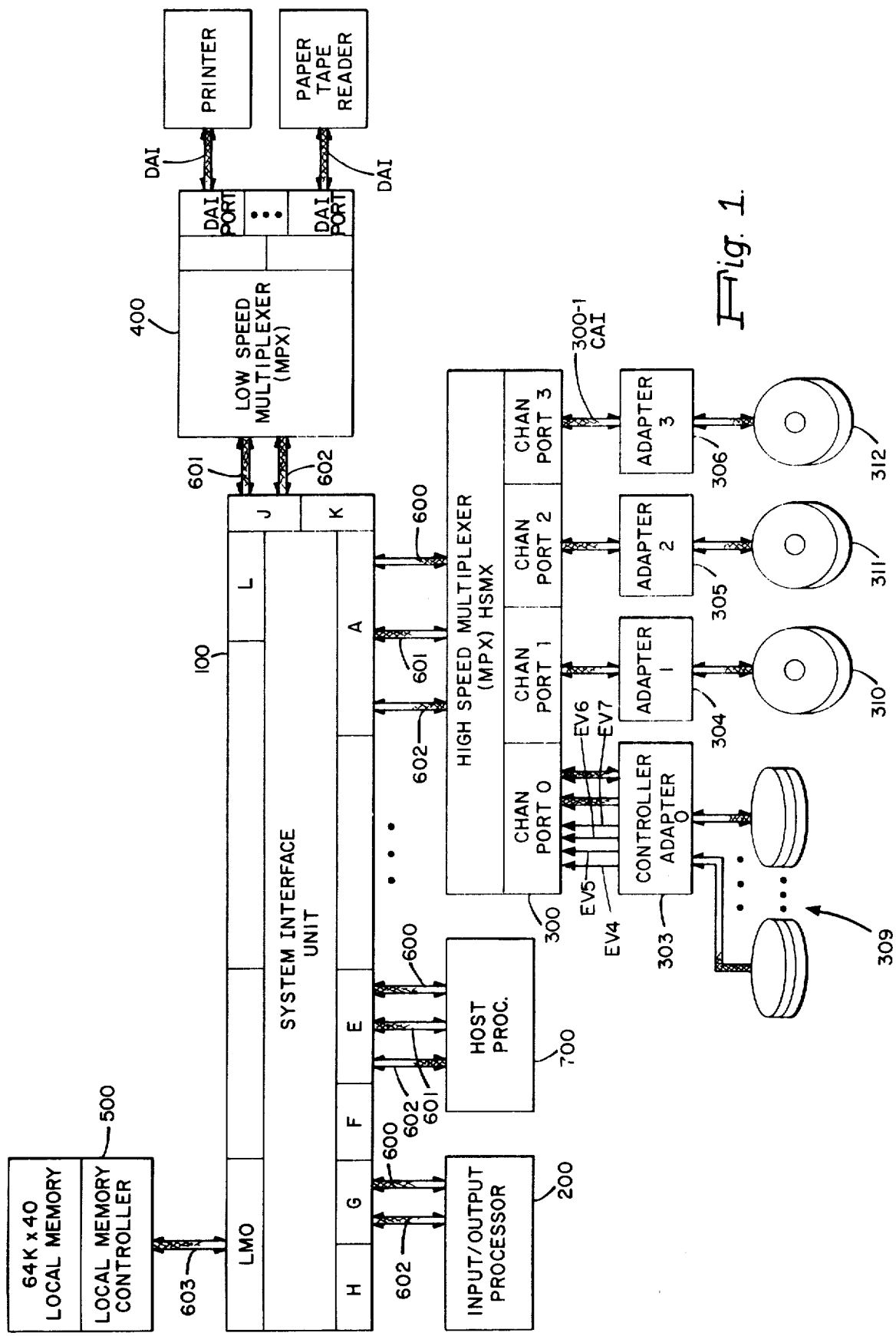
FIG. 1 illustrates in block diagram form an input/output system employing the principles of the present invention.

As seen from FIG. 1, the system which incorporates the principles of the present invention includes at least one input/output processor (IOPP) 200, a system interface unit (SIU) 100, a high speed multiplexer (HSMX) 300, a low speed multiplexer (LSMX) 400, a host processor 700 and at least one memory module corresponding to a local memory module 500. Different ones of these modules connect to one of a number of ports of the system interface unit 100 through a plurality of lines of different ones of different types of interfaces 600 through 603. More specifically, the input/output processor 200, the host processor 700 and high speed multiplexer 300 connect to ports G, E and A respectively while the low speed multiplexer 400 and memory module 500 connect to ports J and LMO respectively.

The input/output system of FIG. 1 can be viewed as including a number of "active modules", "passive modules" and "memory modules". The IOP processor 200, host processor 700 and high speed multiplexer 300 serve as active modules in that each have the ability to issue commands. The active modules normally connect to ports A through H. A plurality of passive modules are connected to three ports J, K and L. These modules correspond to the low speed multiplexer 400 and the system interface unit 100 and are units capable of interpreting and executing commands applied to the lines of interface 601 as described herein. The last group of modules constitute local memory modules and remote memory modules (not shown) such as those of the main system (not shown) which are capable of executing two different types of commands applied to the lines of interface 603.

The input/output system of FIG. 1 normally functions as an input/output subsystem responsive to input/output instructions issued by host processor 700 which normally connects to port F via the interfaces 600, 601 and 602 which correspond to a data interface, a programmable interface and an interrupt interface respectively described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiates and terminates channel programs required for the execution of input/output instructions, processes interrupt requests received from the system interface unit 100 and directly controls unit record peripheral devices coupled to low speed multiplexer 400. The processor 200 connects to port H via the data interface 600 and interrupt interface 602.

The low speed multiplexer 400 which for the purposes of the present invention can be considered conventional in design, provides for attachment of low speed peripheral devices via peripheral adapters, each of which couple to the lines of a device adapter interface (DAI). The interface and adapter may take the form of those units described in U.S. Pat. No. 3,742,457 which is assigned to the assignee of the present invention. The low speed devices include card readers, card punches and printers. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 302 to 305. Each of the channel controller adapters 303 through 306 which can to a maximum of 16 devices, in turn connects to a different one of the ports or channels 0 through 3 via the interface lines of a channel adapter interface (CAI) 301-1. The high speed multiplexer 300 connects to port A correspondding to a data interface 600, a programmable interface 601 and an interrupt interface 602.

For purposes of the present invention, each of the channel controller adapters 302 through 305 may be considered conventional is design and take the form of controller adapters described in the aforementioned U.S. Pat. No. 3,742,457.

As mentioned previously, each of the modules connect to different ports of the system interface unit 100.

The unit 100 controls the connection of the different modules to each other via transfer paths enabling the transfer of data and control information between pairs of modules. For the purposes of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determine the relative priority of interrupt requests received from each of the modules and selects the highest priority request received and passes the request to processor 200 via a switching network as explained herein.

THE PORT INTERFACES

Before describing in greater detail different one of the modules of FIG. 1, each of the interfaces 600 through 603 referred to previously will now be described with reference to FIGS. 5a through 5d.

Figure 5A:
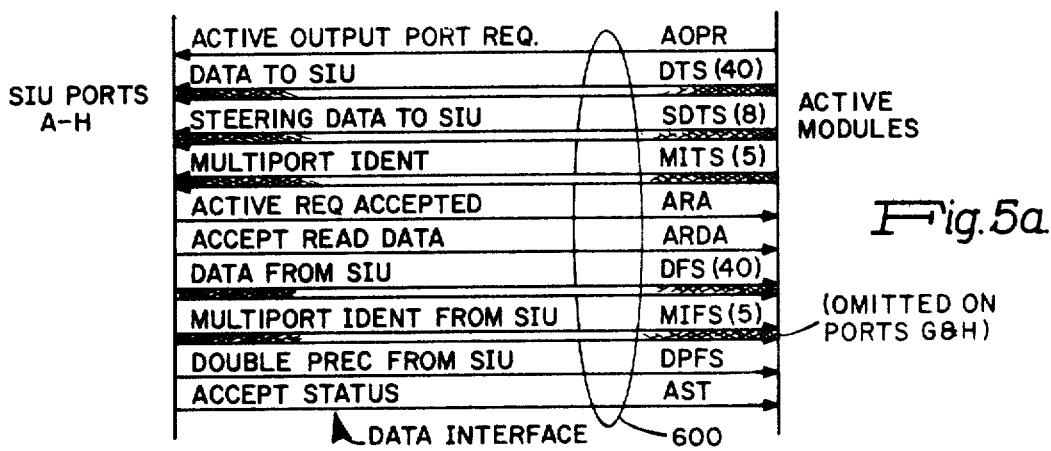
FIGS. 5a through 5d show the various interfaces of FIG. 1.

Referring first to FIG. 5a, it is seen that this figure discloses the lines which constitute the data interface which is one of the interfaces which provides for exchange of information between an active module and the system interface unit 100. Exchange is accomplished by controlling the logical states of various signal lines in accordance with pre-established rules implemented through a sequence of signals termed a "dialog".

As seen from FIG. 5a, the interface includes an active output port request line (AOPR), a plurality of data to SIU lines (DTS 00-DTS 35, P0-P3), a plurality of steering data to SIU lines (SDTS 0-6, P), a plurality of multiport identified to SIU lines (MITS O-3, P), an active request accepted line (ARA), an accept read data line (ARDA), a plurality of data from SIU bus lines (DFS 00-35, PO-P3), a plurality of multiport identifier from SIU lines (MIFS O-3, P), a double precision from SIU line (DPFS), and an accept status line (AST). The description of the interface lines are given in greater detail in the section to follow.

| | DATA INTERFACE LINES |
|---|---|
| Designation | Description |
| AOPR | The active output port request line is an unidirectional line which extends from each of the active modules to the SIU 100. When set, this line signals the SIU that the module request a transfer path over which a command or data are to be transmitted. |
| DTS 00-35, P0-P3 | The data path lines are a four byte wide unidirectional path (four 10 bit bytes) that extends between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows. |
| | (a) The state of bit 0 - The type of command applied to the DTS lines (whether the command is a programmable interface command or a memory command). |
| | (b) Bits 1-4 are coded to indicate which |

-continued

DATA INTERFACE LINES

| Designation | Description |
|---|---|
| | one of the modules are to receive and interpret the command (commands are interpreted only by memory modules and programmable interface commands shall be interpreted by all modules except input/output processor 200). |
| | (c) The state of bit 5 indicates whether one or two words of the command information is to be transferred between the requesting active module and the designated receiving module (one word specifies a single precision transfer and two words specifies a double precision transfer). |
| | (d) The state of bit 6 indicates the direction of transfer between the requesting module and the designated receiver module. |
| | (e) Bit P is a parity bit generated by the requesting active module which is checked by apparatus included within the SIU 100. |
| MITS 0-3, P | The four multiport identifier to SIU lines extend from active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, P0-P3 | The data from SIU lines are another set of data path lines which are a four byte wide unidirectional path (four 10 bit bytes) which extends from the SIU to each active module. These set of lines are used by the SIU 100 to convey read type data to a designated one of the active modules. |
| MIFS 0-3, P | The four multiport identifier lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA signals the active module that it should accept status information applied to the DFS lines. |

Figure 5B:
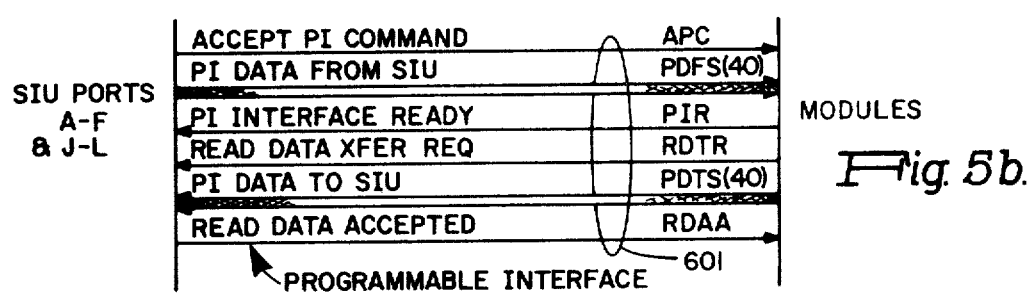

The lines of the programmable interface 601 shown in FIG. 5b provide for transfer of command information from an active module and a designated module. The transfer is accomplished by controlling the logic states of the various signal lines in accordance with pre-established rules implemented through a sequence of signals termed "dialog". The programmable interface includes an accept programmable interface command line (APC), a plurality of programmable interface data from SIU lines (PDFS 00-35, PO-P3), a programmable interface ready line (PIR), a read data transfer request line (RDTR), a plurality of programmable interface data to SIU lines (PDTS 00-35, PO-P3) and a read data accepted line (RDAA). The description of the interface lines are given in greater detail herein.

PROGRAMMABLE INTERFACE LINES

| Designation | Description |
|---|---|
| APC | The accept programmable interface command line extends from the SIU 100 to each receiving module. When set, this line signals the module that command information has been applied to the PDFS lines of the interface by the SIU |

| PROGRAMMABLE INTERFACE LINES | |
|---|---|
| Designation | Description |
| | and is to be accepted by the module. |
| PDFS 00-35, P0-P3 | The programmable interface data from SIU lines are a four byte wide unidirectional path (four 10 bit bytes) that extend from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00-35, P0-P3 | The programmable interface data to the SIU lines are a four byte wide unidirectional path (four 10 bit bytes) that extends from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, the line indicates to the module that the data applied to the lines PDTS has been accepted and that the module may remove the information from these lines. |

Figure 5C:
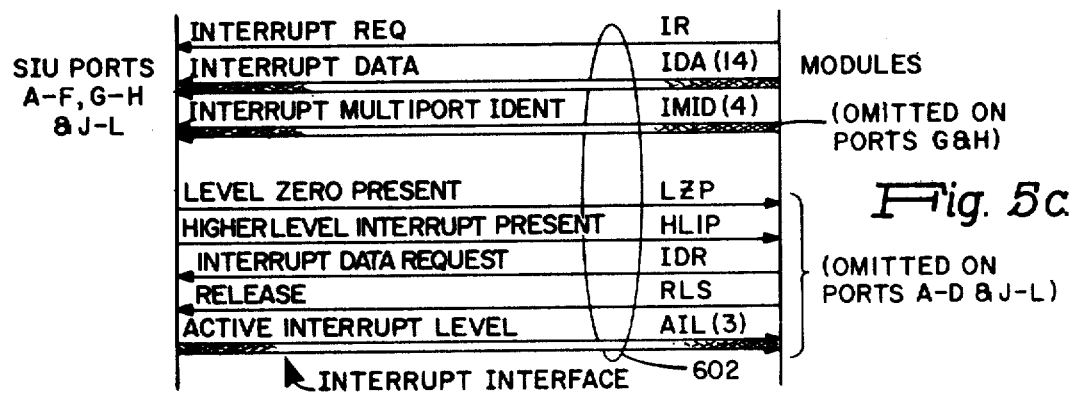

A further interface is the interrupt interface 602 of FIG. 5c which provides for interrupt processing by the input/output processor 200. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog".

The interface includes an interrupt request line (IR), a plurality of interrupt data lines (IDA 00-11, P0-P1), and a plurality of interrupt multiport identifier lines (IMID 00-03) for modules connected to ports A through L. For modules connected to ports G and H, the interrupt interface further includes to a level zero present line (LZP), a higher level interrupt present line (HLIP), an interrupt data request line (IDR), a release line (RLS) and a plurality of active interrupt level lines (AILO-2). As seen from FIG. 5c, the interrupt interface ports G and H do not include an interrupt multiport identifier line. The description of the interrupt interface lines are given in greater detail herein.

| INTERRUPT INTERFACE LINES | |
|---|---|
| Designation | Description |
| IR | The interrupt request line extends from each module to the SIU 100. When set, this line indicates to the SIU that it requires service. |
| IDA 0-3, P0, IDA 4-11, P1 | The interrupt data lnes extend from an active module to the SIU 100. These lines are coded to contain control information required to be transferred to the input/output processor when an interrupt request has been accepted by the processor. These bits are coded as follows: |
| | (a) The state of bit 0 specifies to the SIU 100 which os the two processors (i.e. processor number) is to process the interrupt request. |
| | (b) Bits 1-3 are coded to indicate the priority or level number of the interrupt request to the SIU 100. |

| INTERRUPT INTERFACE LINES | |
|---|---|
| Designation | Description |
| | (c) Bit P0 is a parity bit for bits 0-3. |
| | (d) Bits 4-8 are coded to provide a portion of an address required to be generated by the input/output processor 200 for referencing the correct procedure for processing the interrupt (i.e. an interrupt control block number ICBN). |
| | (e) Bit P1 is a parity bit for bits 4-11. |
| IMID 00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor 200. When set, this line indicates that there is a highest priority (level 0 interrupt) request being directed to the processor 200 by the SIU 100. |
| HLIP | The higher level interrupt present line extends from the SIU to the input/output processor. When set, this line indicates that there is an interrupt request having a higher level or priority than the procedure or process being executed by the processor 200. |
| IDR | The interrupt data request line extends from the input/output processor 200 to the SIU 100. When set, this line indicates that interrupt data is to be sent to the processor on lines DFS by the SIU 100. |
| RLS | The release line extends from the input/output processor 200 to the SIU 100. This line when set indicates that the processor 200 has completed execution of the current procedure. |
| AIL 0-2 | The active interrupt level lines extend from the SIU to the input/output processor 200. These lines are coded to designate the interrupt level number of the procedure being executed by the processor 200. |

Figure 5D:
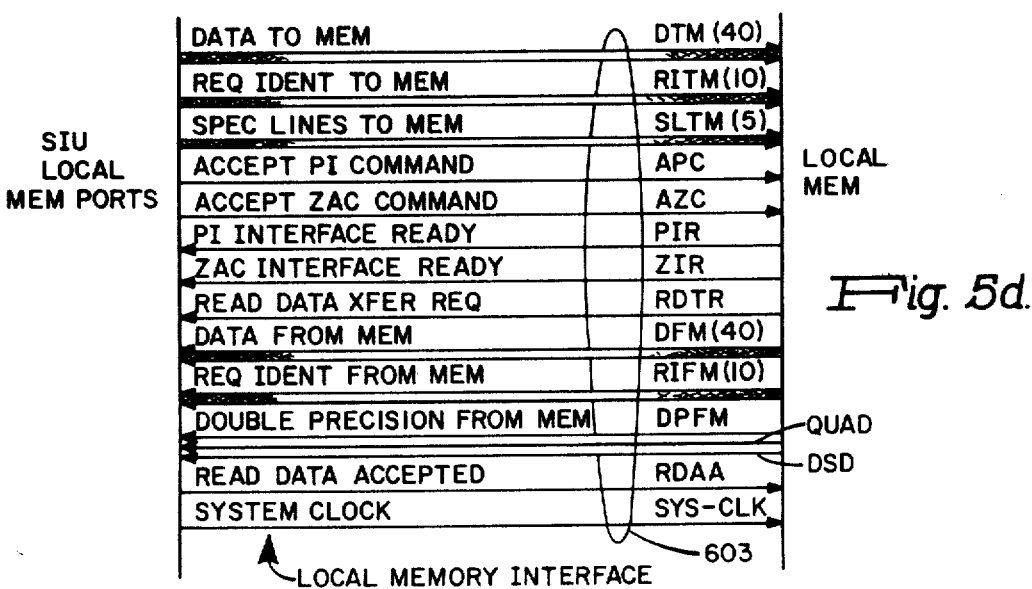

A last set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed a "dialog". The local memory interface includes a plurality of data to memory lines (DTM 00-35, P0-P3), a plurality of request identifier to memory lines (RITM 0-7, P0-P1), a plurality of specification lines to memory lines (SLTM O-3, P), an accept PI command line (APC), an accept ZAC command line (AZC), a PI interface ready line (PIR), a ZAC interface ready line (ZIR), a read data transfer request line (RDTR), a plurality of data from memory lies (DFM 00-35, P0-P3, a plurality of request identifier from memory lines (RIFM 0-7, P0-P1), a double precision from memory line (DPFM), a QUAD line, a read data accepted line (RDAA) and a system clock line (SYSCLK).

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines are given in greater detail herein.

| Designation | LOCAL MEMORY INTERFACE LINES Description |
|---|---|
| DTM 00-35, P0-P3 | The data path lines constitute a four byte wide unidirectional path (36 information lines and for odd parity lines) that extends from the SIU 100 to the local memory 500. These lines are used to transfer memory or programmable interface commands to the local memory 500. |
| RITM 0-3, P0 RITM 4-7, P1 | The requestor indentifer to memory lines constitute two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows.<br>(a) Bits 0-1 are port number selection bits coded to specify which port or subchannel within the attached module is to receive or interpret the memory command sent to the module.<br>(b) Bit 2 is a read/write to memory bit which is included in the steering control information received from the active module which is forwarded by the SIU to the local memory 500 when a new command is sent to the memory by the SIU 100. The state of this bit indicates the direction of data transfer.<br>(c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set, this line indicates that the command information applied to the lines DTM is to be accepted by the local memory module 500. |
| PIR/LIR | The programmable interface ready line, ZAC interface ready line extends from the local memory module 500 to the SIU 100. When set, this line signals the SIU 100 that the local memory module 500 is capable of accepting a programmable interface (PI)/(LAC) command. |
| RDTR | The read data transfer request line extends from the local memory module 500 to the SIU 100. This line when set indicates that the read type data previously requested by a ZAC or PI command is available along with the necessary control information to be sent to the module requesting the data. |
| DFM 00-35, P0-P3 | The data from memory lines are a four byte wide unidirectional bus which extends from |

-continued

| Designation | LOCAL MEMORY INTERFACE LINES<br>Description |
|---|---|
| | the local memory module 500 to the SIU 100. These lines are used to return read requested type data to an active module via the SIU 100. |
| RIFM 0-3, P0,<br>RIFM 4-7, P1 | The two groups of requestor indentifier from memory lines extend from the local memory module 500 to the SIU 100. These lines are coded for directing the read data back from module 500 to the requesting module. |
| DPFM and QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows<br>QUAD DP FM<br>  0      0      one word single precision<br>  0      1      two words, double precision<br>  1      X<br>  (dont't care)    four words |
| DSD | The read data/status indentifier line extends from the local memory module 500 to the SIU. The state of this line signals the SIU 100 whether the information applied to the lines DFM is read data or status information when line RDTR is set. When set, the line indicates status information of one or two words (QUAD=0) is being transferred. When reset to a binary ZERO, the line signals that up to four words of data are beng transferred, the number being specified by the coding of lines QUAD and DPFM. |
| RDAA | The read data accepted line as mentioned in connection with the programmable interface extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected to a clock source included within the input/output processor 200 to synchronize the operations of each memory module from a common system clock source. |

While FIGS. 5a through 5d show the lines which connect the different modules of the system of FIG. 1 to the SIU 100, it will be appreciated that other lines are also included for signaling other conditions as for example error conditions and operational conditions. Having described the different types of interfaces utilized by the modules of FIG. 1, each of the modules pertinent to the understanding of the present invention will now be described in greater detail.

DETAILED DESCRIPTION OF INPUT/OUTPUT PROCESSOR 200

Figure 2:
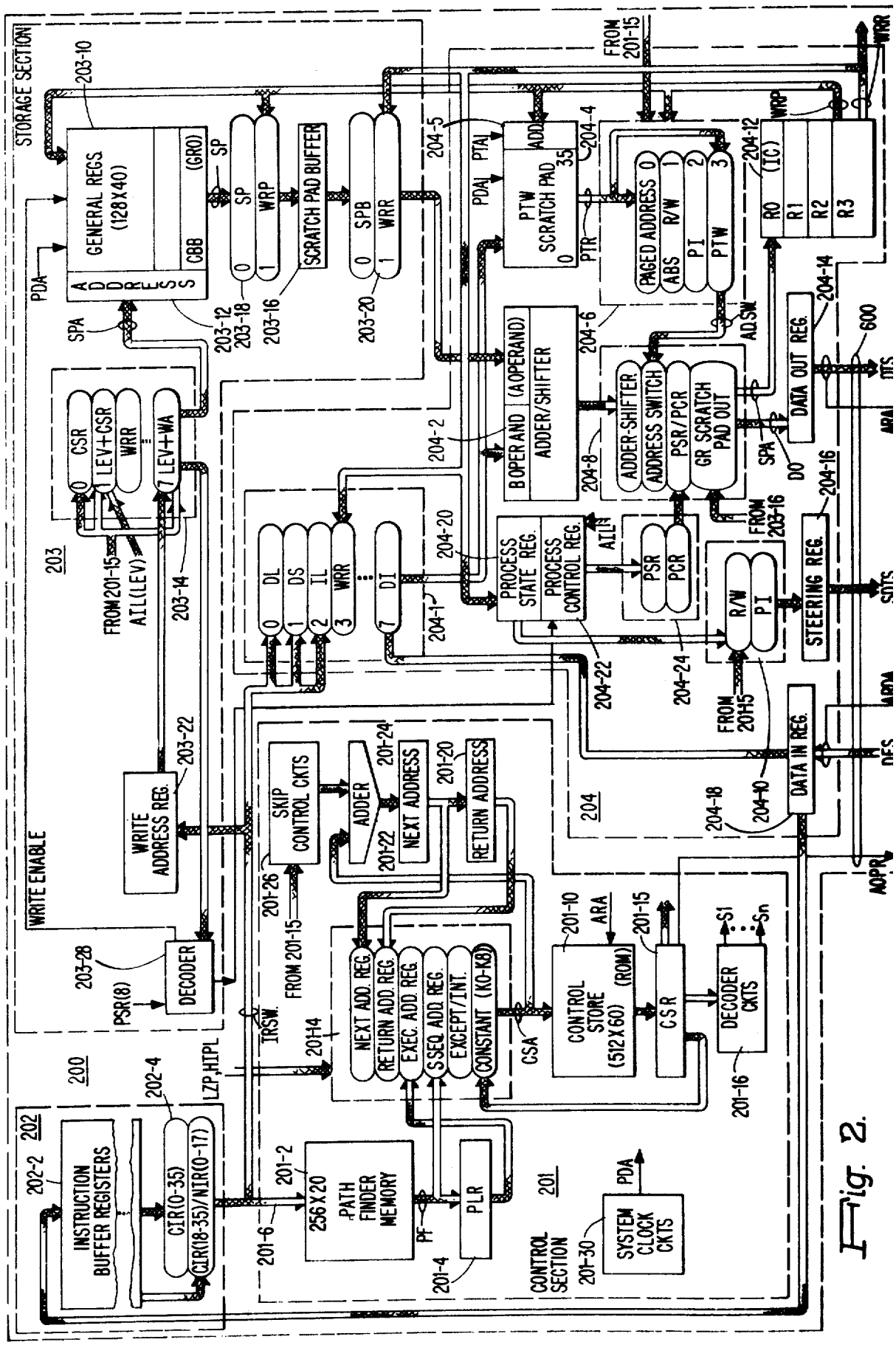
FIG. 2 shows in greater detail the input/output processing unit of FIG. 1.

Referring to FIG. 2, it is seen that the processor 200 comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic and logic operations under the control of microprograms stored in control store 201-10.

CONTROL STORE SECTION 201

Considering each section in greater detail, the control store 201-10 is constructed of fixed sections which use for example a read only memory (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an execution address register position which receives an address from a pathfinder memory 201-2 via memory output register 201-4; a sequence address register position which also receives an address from register 201-4; and a constant position which receives a constant value from the output register 201-15.

The appropriate next address is generated by adder circuit 201-24 which receives as one operand input, address signals from one of the sources selected by switch 201-14 and as the other operand input, signals from skip control circuits of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operation specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher level interrupt present signal is not inhibited or there is a signal applied to the LZP line, signals from circuits, not shown connected to switch 201-14 select the exception/interrupt position. The signal lines indicative of the presence of an interrupt (LZP and HIPL) cause the selection of an interrupt sequence of microinstructions to be referenced in lieu of referencing the microinstruction sequence for executing the next program instruction.

Signal lines indicative of exceptions are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g., faults, illegal instructions). The exception is processed upon the completion of execution of the program instruction where the condition does not require immediate attention (e.g., time out, overflow, etc.). As explained herein, the occurrence of exceptions cause the exception/interrupt position of 201-14 to be selected and the setting of an appropriate bit position in process control register 204-22.

Timing signals, designated as PDA in FIG. 1, required for establishing appropriate memory cycles of operation for control section 201 as well as timing signals for operating other sections of processor 200 and the other modules of the system of FIG. 1 are provided by clock circuits included within a block 201-30. For the purpose of the present invention, the clock circuits as well as the other circuits of FIG. 2 can be considered conventional in design and can for example take the form of circuits disclosed in the publication titled "The Integrated Circuits Catalog for Design Engineers" by Texas Instruments Inc., printed 1972. More specifically, the clock circuits can comprise a crystal controlled oscillator and counter circuits while the switch 201-14 can comprise a plurality of data selector/multiplexer circuits.

From the above, it is seen that as in most microprogrammed controlled machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 2 for addressing of the different scratch pad memories and selection of operands, signals for specifying various test conditions for branching, signals for controlling the operation of an adder/shifter unit of section 204 and signals for providing control information necessary for generating commands. For more detailed information regarding the operation of control section 201, reference may be made to the copending application titled "Pathfinder Control Memory" invented by G. Wesley Patterson et al which is assigned to the assignee of the present invention. Reference may also be made to other ones of the documents referenced in the introductory portion of the specification.

INSTRUCTION BUFFER SECTION 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

STORAGE SECTION 203

As seen from FIG. 2, this section comprises a scratch pad memory containing eight sets or groups of registers associated with eight different processes each assigned a different one of eight priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to address inputs 203-12. The three most significant bit positions of address inputs 203-12 select one of the eight sets of registers (i.e., the level) while the remaining four bits select one of the 16 registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9–12 or bits 14–17 of the current program instruction as designated by one of the fields of the microinstruction contained in register 201-15. Accordingly, the write address register provides address storage for loading or returning a result to one of the general registers of scratch pad memory 203-10. The write operation occurs upon the generation of a write clock signal which occurs either in response to switching to a binary ONE a clocked write flip-flop not shown, or in response to a field of a microinstruction loaded into register 201-15. When generated by the write flip-flop, the write clock signal occurs when the write flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flop is in a binary ONE state. Additionally, the decoder network 203-28 receives a mode signal from the process state register 204-20. The state of the signal which indicates whether the processor 200 is in a master or slave mode of operation is "ANDED" with the output signal and is used to generate an exception signal on another output line which is applied as an input to process control register 204-22 and to one causes selection of the exception-interrupt position of switch 201-14. As explained herein, this prevents alteration of the contents of the process state register location (GRO) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e., master or slave). The register also includes an external register bit position coded to indicate whether the register contents can be altered, an address mode bit position, two condition code bit positions, a carry bit position and 22 bit positions for storing a count which is periodically decremented while the associated process is active (i.e., serves as a "process timer"). Because of the frequency of access to the contents of the process state register required for modification or reference, signals representative of the contents of this register are stored in one of the registers of the processing section 204 (i.e., register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2-14) for providing temporary storage for operands and address information. The scratch pad memory 203-10 also includes a control block base (CBB) register location which stores an absolute address pointing to the base of an exception control block and interrupt control block tables stored in local memory module 500. The first register GRO of the highest priority set of registers (level 0) which is never altered, stores the control block base information. The interrupt control block (ICB) tables include 256 groups of storage locations which store information for processing the type of interrupt. The exception control block (ECB) tables include 16 groups of storage locations which store information for processing the type of exception.

Exceptions are processor detected conditions which cause the processor 200 to enter automatically one of the 16 exception processing routines. The exception conditions are identified by a four bit exception number which corresponds to bits 10–13 of the program instruction when the processor enters master mode. In all other instances, the exception number is ZERO. The exception number (ECB No.) is used to identify one of the four word exception control blocks (ECB) which points to an exception processing routine. The byte address of an ECB equals the control block base (CBB) + 16 (ECB No. +1). Each ECB includes values for loading the PSR, IC and PTBR registers in addition to a saving area pointer which serves as a stack area for storing information pertinent to the current process before the processor 200 enters the exception routine.

The address of an interrupt control block (ICB) equals the control block base (CBB) + 16 (ICB No.). The ICB No. is obtained from the interrupt word as explained herein. Similarly, the ICB is a four word block and it contains values for the PSR, IC, GR14 and PTBR registers.

PROCESSING SECTION 204

This section performs all of the arithmetic and logic operations required to process program instructions. The section 204 includes an adder/shifter unit 204-1 capable of performing arithmetic, shift and logic operations upon a pair of 36 bit operands. The results produced by either an adder portion or shifter portion of unit 204-1 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purposes of the present invention, the adder/shifter unit 204-1 can be considered conventional in design. Also, the unit 204-1 may include either circuits such as those disclosed in U.S. Pat. No. 3,811,039 to John P. Stafford or circuits disclosed in other documents referenced in the introductory portion of the present specification.

The block 204-12 includes four working registers RO through R3 which provide temporary storage for the instruction counter and for addresses during instruction execution. The registers can be loaded from any one of the sources connected to switch 204-8 (i.e., adder/shifter 204-1, address switch 204-6, PSR/PCR switch 204-24 and scratch pad buffer input switch 203-18). The register to be loaded and the write signal required for loading the register is established by fields included within the micro-instruction read out to register 201-15.

As seen from FIG. 2, the registers are connected to a pair of output buses WRP and WRR. The WRP bus connects to address inputs 204-5, to switch 203-18 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 2, the processing section 204 includes process state register 204-20 and a process control register 204-22. The process state register 204-20 as mentioned is loaded from scratch pad memory 203-10 via output bus WRR. The process control register 204-22 is a 36 bit register common to all eight interrupt levels.

The bit positions of the process control register 204-22 contain the following information. Bit positions 0–8 designate different types of non master mode exceptions which include the following.

| PCR BIT POSITION | EXCEPTION TYPE |
| --- | --- |
| 0 | Operation not complete; no response from SIU 100 on lines ARA or ARDA. |
| 1 | Page address bounds fault (key check). |
| 2 | Page access fault |
| 3 | Page not resident in memory |
| 4 | Illegal operation |
| 5 | Process timer run out |
| 6 | Overflow |
| 7 | Lockup fault |
| 8 | Address misalignment |

The term "fault" does not necessarily mean the occurrence of a hardware failure but includes error conditions, etc.

Bit positions 9–15 identify the location of parity errors and bit positions 23–26 identify the processor number and level received from the PNID and ALL lines. Bit position 27 is an interrupt inhibit bit position while bit positions 28–35 store interrupt request bits which when set to a binary ONE indicate an interrupt at a level corresponding to the bit position (e.g., bit 28 = level 0). The bit positions 27–35 are loadable by program instruction from the bank of registers of block 204-12 via output bus WRR.

The contents of each of the registers 204-20 and 204-22 are selectively applied as an input to another one of the positions of the four position data selector switch 204-8 via a two position data selector switch 204-24. The register 204-20 also connects to the PI positions of a two position steering selector switch 204-10 and a four position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 or absolute address information from bus WRP.

In the case of a PI command, the steering information is generated as follows: bit 0 is forced to a binary ONE for a PI command; bits 1–4 correspond to bits 0–3 of register 204-20; and bits 5–6 correspond to bits of one of the fields of the microinstruction which are coded to designate whether it is a single or double word transfer and whether it is a read or write cycle of operation. Upon the start of a memory cycle or initiation of a command, the signals from the steering switch 204-10 are loaded into a steering register 204-16 which applies the signals to the appropriate lines of the data interface 600 of processor 200. As explained herein, the command including additional steering information is provided by position 2 of address switch 204-6 in the case of a PI command.

As also seen from FIG. 2, processing section 204 includes a scratch pad memory 204-4 addressable via address inputs 204-5 which receives address signals from one of the registers connected to the WRP bus. The scratch pad memory 204-4 provides page table address storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein. For further information regarding the use of paged addressing, reference may be made to the documents cited at the introductory portion of the specification.

The other two positions of the address selector switch 204-6 are used to provide the memory or PI command. More specifically, position 1 of address switch 204-6 when selected by an address control field of a microinstruction word stored in register 201-15 generates the R/W memory command information which includes bits 0–8 coded in accordance with predetermined fields of the micro-instruction word and bits 9–35 coded to correspond to either paged address information from memory 204-4 or absolute address bits applied to output bus WRP by the working registers of block 204-12. When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external registers, bits 5–8 are equal to bits 4–7 of register 204-20 and define the port or subchannel within the module, bit 3 is coded to specify the processor pair number supplied by the SIU 100, bit 4 is a ZERO and bits 9–35 equal bits 9–35 of bus WRP which correspond to the absolute address of the PI command.

DETAILED DESCRIPTION OF SYSTEM INTERFACE UNIT 100

INTERRUPT SECTION 101

Figure 3A:
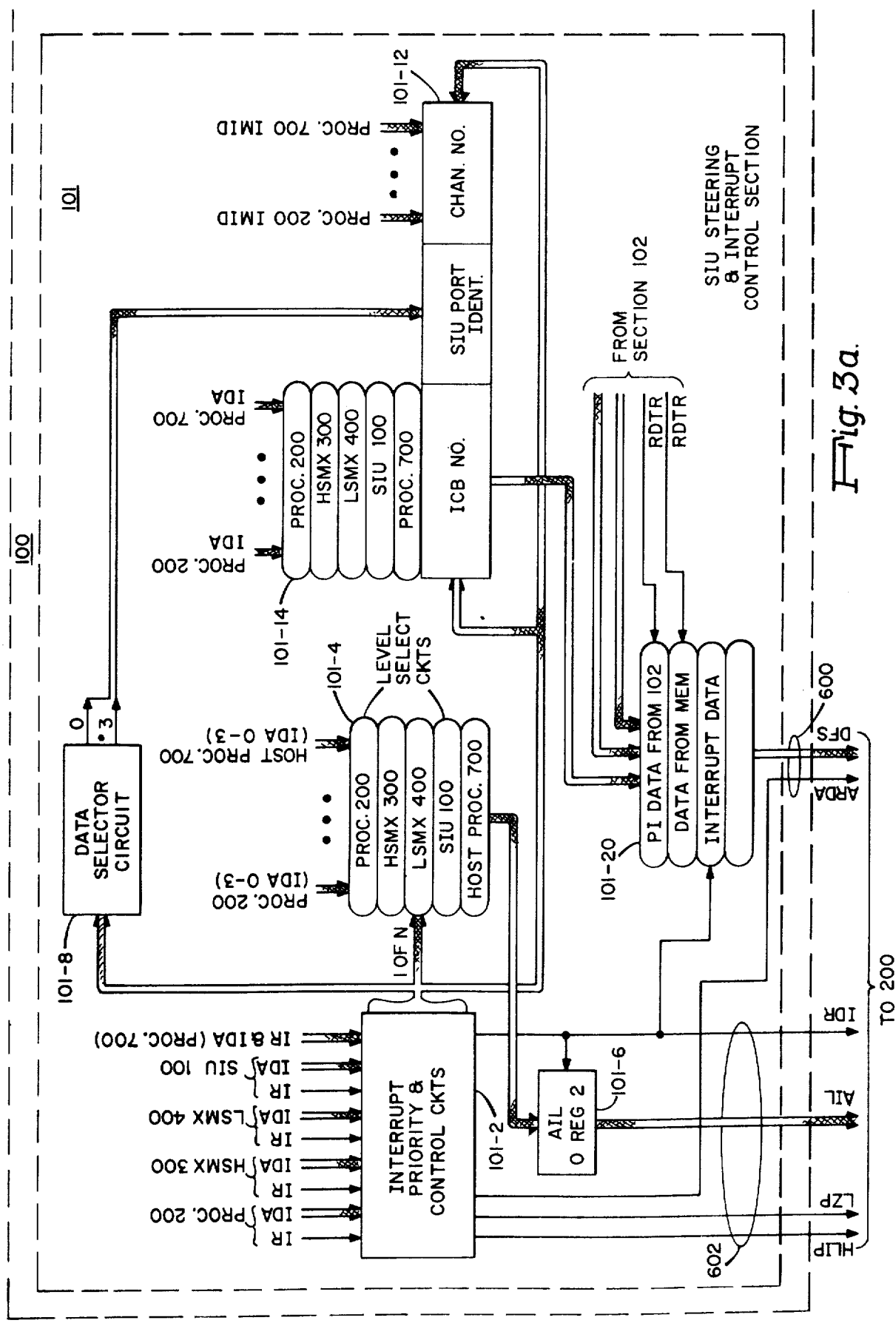
FIGS. 3a and 3b show in greater detail the system interface unit of FIG. 1.

The System Interface Unit 100 as mentioned provides for communication between modules of the system of FIG. 1 via a plurality of crossbar switches Separate crossbar switches are used to collect signals from the lines of each of the different interfaces of the modules. FIG. 3a shows the switches and circuits of interrupt section 101 for handling the module interrupt interfaces. In the system of FIG. 1, there are modules which connect to ports LMO, A, E, G and J, each of which apply signals to the SIU 100 via different ones of the lines of its interrupt interface 602. Additionally, SIU 100 also provides signals via an interrupt interface associated with port L of FIG. 1.

As seen from FIG. 3a, each of the modules when requesting service applies a signal on its interrupt request (IR) line together with appropriate interrupt identifier information on its IDA lines which are applied to the circuits of an interrupt priority and control block 101-2. The circuits of block 101-2 monitor all interrupt interfaces and signals the appropriate processor corresponding to processor 200 when there is a request having a priority higher than that of the process being executed. When processor 200 signals that it is able to accept the request, the SIU 100 gates the identifier information associated with the highest priority request to the processor 200. The identifier information includes an eight bit interrupt control block number including a parity bit, a three bit interrupt level number and an one bit processor number with a parity bit and a four bit channel number.

Considering interrupt section 101 in greater detail, the circuits of block 101-2 include decoder circuits which decode the processor number and interrupt request signals. Providing that there is no parity error, the output signals from the decoder circuits are applied to priority logic circuits of the designated processor logic circuits. The priority logic circuits decode the interrupt level signals and determine the highest priority level and then determine the port priority so that the module having the highest priority level and highest port priority is selected. The interrupt port priority within any given level is as follows:

Old; port L; port A, port B, port C; port D; port E; port F, port G; port H; port J and port K.
This means that in the system of FIG. 1 that the port of the current process has the highest priority followed by the SIU 100, the high speed multiplexer 300, the host processor 700, the processor 200 and the low speed multiplexer 400.

The priority circuits of block 101-2 are operative to generate an output signal on one of n number of output lines, n corresponds to the number of interrupting modules within the system. The n output lines are applied to an eight position data selector switch 101-4 which selects the interrupt level signals of a level of interrupt having a priority higher than the level currently in progress to be loaded into a register 101-6. The output signals from register 101-6 are applied to the AIL lines when processor 200 forces the IDR line to a binary ONE in response to the SIU 100 having forced prior to the higher level interrupt present (HLIP) line or the level zero present (LZP) line to a binary ONE. When the current process is not inhibited from being interrupted, an interrupt request causes the processor 200 to suspend the current process and to accept an interrupt word from the SIU 100 including the identifier information mentioned previously. More specifically, the interrupt word is formatted as follows.

Bit 0 is a new interrupt bit position. When set to a binary ONE indicates that the interrupt is a new one and when set to a binary ZERO indicates that the interrupt is that of a previously interrupted process that is to be resumed.

Bits 1–17 are unused and are binary ZEROS.

Bits 18–27 define the interrupt control block number with bits 18 and 27 being set to binary ZEROS.

Bits 28–31 are generated by the SIU 100 and identify the source module as explained herein in accordance with the present invention.

Bits 32–35 are generated by the modules having multiple ports and identify the subchannel or port within the source module as explained herein in accordance with the present invention.

For more detailed information regarding the implementation of the circuits of block 101-2, reference may be made to the copending patent application titled "Priority Interrupt Hardware" referenced in the introductory portion of the specification.

It is also seen that the output lines from interrupt priority circuits 101-2 are applied to a further data selector switch circuit 101-8. Since only the requesting module having the highest priority will apply a signal to selector circuit 101-8, the selector circuit is connected to provide a predetermined wired-in set of coded steering signals which identify the physical port to which the requesting module granted priority connects (i.e., bits 28-31 of the interrupt word).

In the present embodiment, the following steering codes are generated for identifying the modules of FIG. 1.

| CODE | SIU PORT (MODULE) IDENTIFIED |
|------|------------------------------|
| 0000 | Local memory module - port LMO |
| 0001 | port K |
| 0010 | SIU 100 - port L |
| 0101 | Low speed multiplexer 400 - port J |
| 0110 | processor 200 - port G |
| 1101 | high speed multiplexer 300 - port A |
| 1110 | host processor 700 - port E. |

The four bit code generated by the selector circuit 101-8 is in turn applied to a group of conventional AND gating circuits included within a gating network 101-12. The other identifier information provided by the different source system modules are also applied to other gating circuits of network 101-12. Specifically, each module applies an interrupt control block number (ICBN) via its IDA lines to a different one of the positions of an eight position data selector switch circuit 101-14. Additionally, each module provides the information identifying the requesting subchannel or port of the source module to other ones of the gating circuits of network 101-12 via the IMID lines of the interrupt interface. When the processor 200 forces its interrupt data request (IDR) line to a binary ONE, the SIU 100 applies the signals from gating network 101-12 to the data from SIU (DFS) bus lines of the processor data interface 600 via one of the positions of a four position data selector switch circuit 101-20. The other positions of switch 101-20 are not shown since they are not pertinent to an understanding of the present invention.

DATA TRANSFER SECTION 102

Figure 3B:
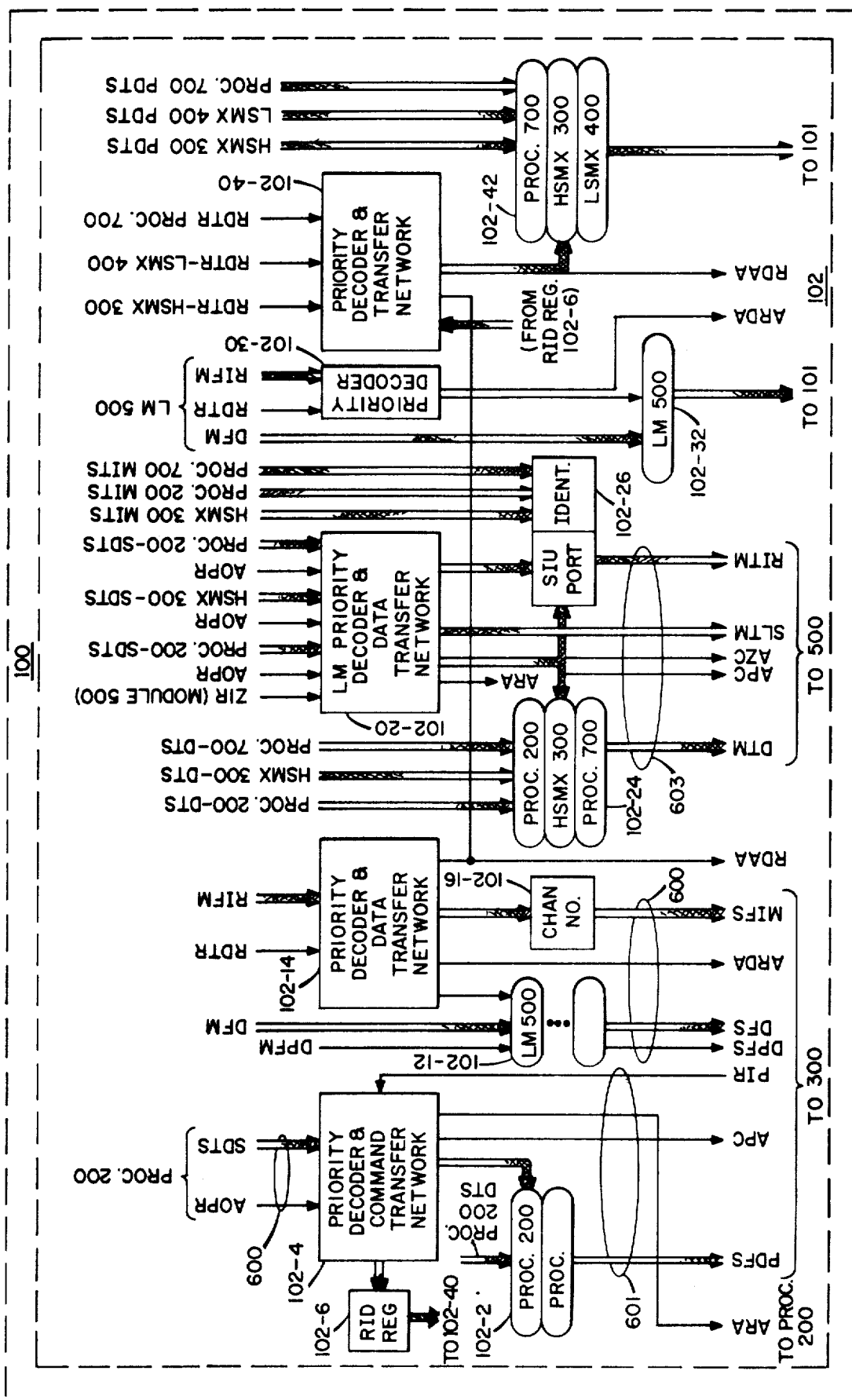

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e., not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuits of block 102-4 is enabled in accordance with a SIU request type control bit field of each microinstructed read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 202-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 500 only and processor 200 applies signals to network 102-4. The network 102-4 therefore includes decoder circuits which decode the steering information from the processor module to establish when the module desires to transfer commands to the multiplexer 300. In the case of more than one I/O processor when more than one module desires to transfer during the same cycle, a priority network included in network 102-4 selects the module assigned the highest priority and enables the transfer of a command by that module to the multiplexer 300 on the PDFS lines of its programmable interface 601. More specifically, the network 102-4 applies signals to the two position selector switch 102-2 which selects signals from the appropriate module. This occurs when the multiplexer 300 signals the SIU 100 that it is ready to accept a command by forcing the PIR line to a binary ONE. At the same time, network 102-4 forces the APC line to a binary ONE signaling the multiplexer 300 to accept the command applied to the PDFS lines. When the processor 200 executes an instruction causing it to send a programmable interface (PI) command to the multiplexer 300, the processor 200 places the processor number identification into bit 3 of the command. The multiplexer 300 stores the processor number contained in the command until it wants to issue an interrupt request at which time the processor number is included as part of the interrupt data as explained herein. When the PI command is forwarded to multiplexer 300, the steering information identifying processor 200 as the requester is stored in a register 102-6 associated with multiplexer 300 (port A). As explained herein, when multiplexer 300 responds by generating a read data transfer request to SIU 100, the contents of register 102-6 is used to identify processor 200 as the actual module to receive the data.

A similar arrangement is employed for transferring data signals to multiplexer 300. In FIG. 1, memory module 500 is the only module which transfers data to multiplexer 300. Such transfer occurs in response to a read memory command (ZAC) forwarded to the memory module 500 by mutiplexer 300 via network 102-20 as explained herein. When multiplexer 300 forwards the command, the SIU 100 generates the appropriate 4 bit requestor identifier code (steering code) which it appends to the multiport identifier information received from multiplexer 300. The information is stored by the memory module 500 and returned to the SIU 100 when the module 500 generates a read data transfer request to designate that multiplexer 300 is to receive the data. Also, when the SIU 100 accepts the request, it notifies the multiplexer 300 by forcing line ARDA to a binary ONE.

The read data transfer request (RDTR) line when set by memory module 500 signals the network 102-14 that it is ready to transfer information read out during a cycle of operation. The local memory module 500 also supplies signals to the requestor identifier from memory (RIFM) lines to identify the requesting module to which the information is to be transferred.

More specifically, circuits within a decoder network 102-14 decode the identify signals applied to the RIFM lines and when the signals indicate that the local memory module 500 is ready to transfer information to the multiplexer 300 and that the multiplexer 300 is ready to receive the information, the decoder network 102-14 applies the appropriate signals to the selector switch 102-12 and circuits within a gating network 102-16.

Additionally, decoder network 102-14 applies a signal to the accept read data (ARDA) line on the data interface signaling the multiplexer 300 that it is to accept the data from SIU (DFS) lines of its interface 600. The circuits of block 102-16 apply the appropriate multiport identifier information to multiport identifier from SIU (MIFS) lines identifying the requesting subchannel which is obtained from the RIFM lines. When the transfer has taken place, the network 102-14 forces the RDAA line to a binary ONE signaling the requesting module that the data has been accepted from memory module 500.

An arrangement similar to network 102-14 is used by SIU 100 to transfer PI and memory commands from any of the modules of FIG. 1 to local memory module 500. The module 500 is operative to force either the programmable interface request (PIR) line or ZAC interface request (ZIR) line applied to a decoder network 102-20 to a binary ONE when it is ready to accept either a programmable interface or memory command. Additionally, the processor 200, the processor 700 and mutiplexer 300 apply a network 102-20 signals to the active output port request (AOPR) line and steering data to SIU lines of their respective data interfaces. The network 102-20 upon decoding the steering information applied by each of the modules is operative to generate the appropriate signals to a three position selector switch 102-24 for enabling the module having the highest priority to apply signals to the data transfer to SIU lines of memory module data interface 603. It is also seen that network 102-20 applies signals to either the accept programmable command (APC) line or accept ZAC command mode (AZC) together with the appropriate requestor identification signals on the request identifier to memory (RITM) lines of the local memory module interface 603 via a gating network 102-26.

The last two networks 102-30 and 102-40 are used to transfer memory data and programmable interface data to processor 200 in response to memory commands and PI commands respectively previously generated by the processor 200. As seen from FIG. 3b, the priority decoder network 102-30 has the same input lines as network 102-14 and operates in the same manner to forward the requested memory data to processor 200 via a data selector switch 103-32 and the four position selector switch 101-20 of FIG. 3a. It will be appreciated that since processor 200 processes a single command at a time, there can be no conflict between the modules applying data to selector switch 101-20 for transfer to the processor DFS lines in response to processor requests. That is, after the processor 200 sends a command to one of the modules of FIG. 1, its operation is stalled pending receipt of the requested data. The SIU 100 upon accepting the processor's request forces the processor's ARA line which causes the processor to delay operations.

The separate network 102-40 processes return data requests from those modules responding to PI commands. The network 102-40 decodes the signals applied to the RDTR lines and from register 102-6 together with registers of the other modules, not shown. When the SIU 100 detects that module is trying to return requested data to processor 200 (i.e., requestor identifier stored in multiplexer 300 register 102-6), the network 102-40 generates signals which conditions a three position data selector circuit 102-42 to apply the signals from the PDTS lines of the PI interface of the module trying to return requested data to processor 200. These signals are in turn applied to the processor's DFS lines via selector switch 101-20 of FIG. 3a which is conditioned by the module request signal. During the next cycle of operation, the network 102-40 forces the RDAA line to a binary ONE signaling the module that the data applied to the PDTS lines has been accepted and that the module can now remove such data (i.e., clear its output register). Thus, it is seen that switch 101-20 selectively applies any one of three types of data to the DFS lines of the processor's data interface 600.

For the purpose of the present invention, the circuits included within different ones of the blocks of FIG. 3b may be considered conventional in design and include logic circuits found in the aforementioned publication by Texas Instruments Inc. Also, for the purposes of the present invention, the switching networks can comprise conventional crossbar switches.

DETAILED DESCRIPTION OF HIGH SPEED MULTIPLEXER 300 COMMON SECTION

Figure 4A:
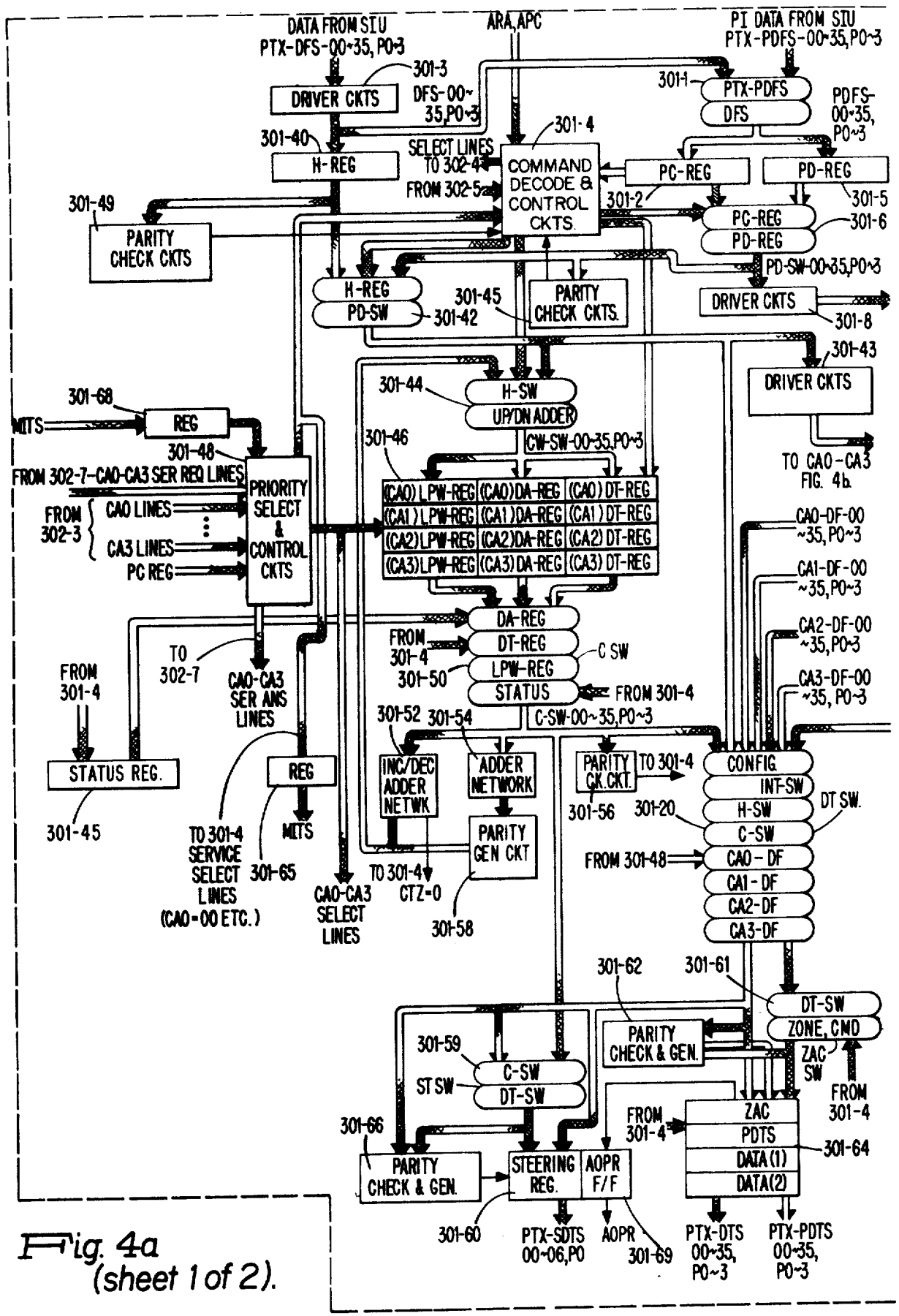
FIGS. 4a and 4b show in greater detail the multiplexer unit of FIG. 1 in accordance with the present invention.
Figure 4B:
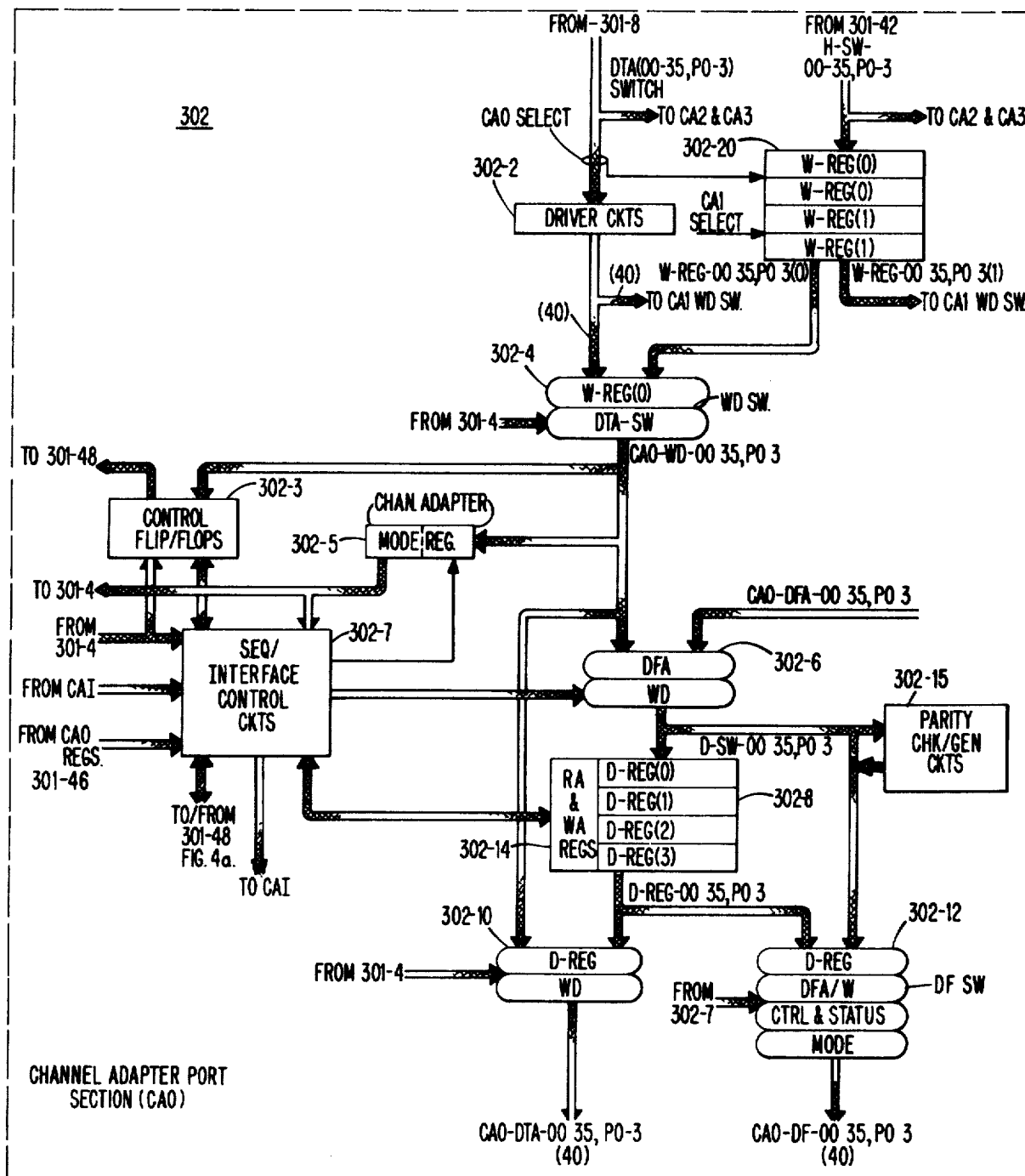

FIGS. 4a and 4b disclose in greater detail the common control section 301 and a portion of the channel adapter section 302. Referring first to FIG. 4a, it is seen that the common control section includes a pair of registers 301-2 and 301-5 for storing the words of a PI command received via the PDFS lines of the multiplexer programmable interface 601 through a two position data selector switch 301-1. The switch 301-1 enables PI command signals from a alternate path (i.e., DFS lines) to 301-5. loaded into registers 301-2 and 3-1-5. However, in the preferred embodiment, only the PDFS position will be used. It is also seen that a register 301-40 receives via driver circuits 301-3 memory data applied to the DFS lines of the multiplexer data in interface 600.

The command signals from both registers 301-2 and 301-5 are selectively applied via a two position data selector switch 301-6 of the four channel adapter sections via driver circuits of block 301-8. Also, the command signals can be selectively applied to one position of an eight position data selector switch 301-20 via a two position data selector switch 301-42. The same switch 301-42 also applies the data signals from register 301-40 to each of the four channel adapter sections via driver circuits of block 301-43.

A pair of parity check circuits 301-45 and 301-49 perform a check upon the contents of registers 301-2, 301-5 and 301-40 and apply signals representative of the results to the circuits of block 301-4. These circuits comprise logic circuits, conventional in design, which combine signals from register 301-2 with signals from the channel adapter sections to generate status control signals necessary for executing the commands received from processor 200. That is, indications of the resulting control signals are stored in a status register 301-45. The output contents of register 301-45 can be transferred via the status switch position of C switch 301-50 to the processor 200 and used to establish the cause of error conditions and exceptions as explained herein.

Additionally, the signals from register 301-5 can also be loaded into a selected one of the plurality of registers of blocks 301-10, 301-12 and 301-14 via driver circuits of blocks 301-8, 301-15 and 301-16. The block 301-10 comprises four 8 bit registers, conventional in design, which may take the form of registers disclosed in the aforementioned Texas Instrument publication (e.g., TI 7481). Output signals from each of these registers can be selectively applied as an input to an interrupt position of selector switch 301-20 together with the corresponding signals from a four position selector switch 301-30 and an eight position selector switch 301-32. The contents of the ICB, level and mask registers of the channel adapter sections can be read during the performance of testing and verification operations in response to PI commands.

Additionally, the interrupt control block registers of block 301-10 are selectively connected to a 14 bit interrupt data (IDA) register 301-22 in response to signals generated by an interrupt level priority network 301-24. Groups of bit positions of each of the 24 bit level registers of block 301-12 are applied to corresponding positions of a different one of the 8 position multiplexer selection switches 301-26 through 301-28. It is also seen that each of the level registers of block 301-12 connect to different positions of the four position selector switch 301-30 and eight position selector switch 301-32. It is also seen that each of the 8 bit mask registers of block 301-14 connect to different positions of the four eight selector switch 301-32 and to the interrupt enable priority and type logic circuits of block 301-34.

As seen from FIG. 4a, the circuits of block 301-34 receive groups of interrupt request signals from channel adapters in addition to groups of interrupt signals generated by the controller adapters attached to the channel adapters. More specifically, each CA channel can generate four different types of interrupt requests. They include a fault interrupt caused by setting of a parity error indicator bit within a common status register, not shown, which can be considered as part of block 301-4, a data control word (DCW) interrupt, a programmable interrupt, and an exception interrupt produced by the detection of an illegal command etc. The fault interrupt is made common to each channel so as to have one input to block 301-34 which is the same for all four channels.

Each controller adapter can also generate four different types of interrupt requests which are dependent upon the type of device connected to the adapter. In the case of a disk device, the types of interrupt requests include: a fault interrupt caused by detection of parity errors, a rotational position sensed interrupt, a data transfer termination interrupt and an off-line interrupt caused by completion of an off-line operation such as a seek operation. The four types of channel interrupt requests and the four types of CA interrupt requests together provide a group of eight types per CA channel designated as events EV0 through EV7. Each type of interrupt request is assigned a three bit type number such that the four channel types of interrupt requests are numbered 0-3 corresponding to EV0-EV3 while the four controller adapter types of interrupt requests are numbered 4-7 corresponding to EV4-EV7. The events having the lowest codes have the highest priorty (e.g. 000 = highest priority = EV0 = fault interrupt and 111 = lowest priority type = EV7 = off-line interrupt). The priority for the different types of interrupt requests is fixed and is determined by the type number. For further information regarding the assignment of priority types, reference may be made to the copending application titled "Programmable Interface Apparatus" which is assigned to the assignee of the present invention. Each of the channels provide 7 interrupt requests inputs to block 301-34 together with the common fault input provided by block 301-4.

The circuits within block 301-34 logically combine the signals from each of the mask registers of block 301-14 with the interrupt request signals from each channel and adapter and select the interrupt type having the highest priority for each channel. The three bit type code for each channel is applied to a corresponding one of the multiplexer selector circuits 301-25 through 301-28. The sets of type codes generated by block 301-34 are also applied as inputs to corresponding ones of the positions of a four position level-type selector switch 301-35.

Each of the multiplexer circuits 301-25 through 301-28 upon being enabled by the circuits of block 301-34 provide an appropriate three bit level code as an input to an interrupt level priority network 301-24. The network 301-24 generates signals on a pair of lines which connect as control inputs to the ICB registers of block 301-10, the switch 301-35 and a four position interrupt multiport identifier IMID switch 301-36. The signals generated by network 301-24 designate the channel or port having the highest priority. In the case where more than one channel has the same priority level, the circuits of network 301-24 select the channel assigned the lowest channel number (i.e., CA0=00X-X=highest priority, CA3=11XX=lowest priority). In those instances where the controller adapters employ subchannels or subports, a pair of lines from the CAI provide signals to the low order two bit positions, of switch 301-36. The high order 2 bit positions of the switch are permanently with the corresponding channel adapter number (e.g. 00=CA0 etc.). The output of switch 301-36 is applied to IMID register 301-23 as depicted in FIG. 4a.

The output signals from the selected ICB register of block 301-10, the level signals from the selected multiplexer circuits and the type signals from block 301-34 are merged into the IDA register 301-22. Also, these signals are applied to the parity generator circuits of a block 301-37 which generates a pair of odd parity bits for the signals stored in the register 301-22. A further flip-flop 301-21 which can be considered part of register 301-22 receives a signal from the circuits of block 301-34 to indicate the presence of an interrupt request.

As seen from FIG. 4a, data signals stored in bit register 301-40 are applied via the H register position of two position data selector switch 301-42 to a two position channel write (CW) switch 301-44. The first position of the switch 301-44 when selected loads one of the four groups of channel adapter port registers 301-46 selected in response to signals generated by priority select and control circuits of block 301-48. The circuits of block 301-48 which receive input signals from registers 301-2 and 301-68 and the channel adapters shown apply output signals to the lines and output register 301-65. The registers of group 301-46 include a 40 bit register for storing a list pointer word (LPW) for the port associated therewith, a 40 bit DA register for storing the address of data to be read or stored and a 40 bit register DT for storing tally and control information relating to a current data transfer operation. The same registers of the four channel adapter sections connect to different positions of a four position data selector switch 301-50 which receive control signals from the circuits of block 301-48. The output signals from switch 301-50 are applied to a pair of adder networks 301-52 and 301-54 in addition to a parity check circuit 301-56 operative to check the contents for errors. The adder network 301-52 is operative to update the contents of the register selected via switch 301-50 while the adder network 301-54 applies output signals to a parity generator circuit 301-58. The signals from the circuits 301-52 and 301-58 are returned to the selected register via the update network position of switch 301-44.

As also seen from FIG. 4a, the output signals of switch 301-50 are applied selectively to an 8 bit steering register 301-60 via a steering switch 301-59 and to the DT switch 301-20. Each of the data selector switches 301-59 and 301-61 receives output signals from DT switch 301-20 which in addition to the sources mentioned is connected to receive data signals from the DF lines of each of the channel adapter sections CA0-CA3. The output signals from DT switch 301-20 and ZAC switch 301-61 are applied to a parity generator and check circuit 301-62 and to the bank of registers of block 301-64. Additionally, switch 301-61 is connected to receive zone and command information derived from channel adapter service lines applied to block 301-4 when the multiplexer 300 is being operated in a particular mode not pertinent to the present invention. The four registers of block 301-64 designated as ZAC, PDTS, Data 1 and Data 2 respectively store memory command signals, PI data signals and channel adapter data signals. The ouput signals from these registers are applied either to the lines DTS of the multiplexers data interface 600 or the PDTS lines of the multiplexers interface 601. When the ZAC register of block 301-64 is loaded, this causes an AOPR flip-flop 301-65 to be switched to a binary ONE which signals the SIU 100 that the multiplexer 300 is requesting a path over which it can transfer a memory (ZAC) command and data. The appropriate memory steering information applied via switch 301-59 will have been stored in register 301-60 and a parity check and generator circuit 301-66 is operative to generate odd parity for the steering information.

CHANNEL ADAPTER SECTIONS

FIG. 4b shows the registers and data selector switch which comprise each of the channel adapter sections CA0–CA3. Since each of the sections are identical, only section CA0 is shown. It is seen that the section receives output signals from data transfer switch 301-6 and H switch 301-42. The signals from DT switch 301-6 are applied via driver circuits of block 302-2 to a two position data selector (WD) switch 302-4. The output command signals from switch 302-4 can be loaded selectively into either a mode register 302-5 or into a plurality of control flip-flops 302-3 in response to control signals from 301-4.

Output signals from the mode register 302-5 and the control flip-flops ae applied as inputs to the logic circuits of block 302-7 which generate the required control signals from execution of a command by the controller adapter connected to the section. Also, the circuits of block 302-7 receive control signals from block 301-4 from the register group 301-46 associated with the channel adapter and from the lines of the controller adapter interface.

In the present embodiment, the controller adapter interface includes the following lines.

| Designation | CONTROLLER ADAPTER LINES<br>Description |
|---|---|
| DTA | The data to adapter lines are 40 lines which extend from the module 300 to the controller adapter used to transmit data including commands and addresses to the adapter. |
| ADTA | The accept data to adapter line extends from the module 300 to the adapter and when set indicates that data is available on the DTA lines and that it should be accepted by the adapter. |
| ACTA | The accept control to adapter line extends from the module 300 to the adapter and when set indicates that a PI command or data is available on the DTA lines and that it should be accepted by the adapter. |
| CHBSY | The channel busy line extends from the module 300 to the adapter and when in an indirect mode indicates to the adapter that the multiplexer 300 is now in an Auto data transfer mode; the channel remains busy until the termination of the Auto data transfer operation. In a direct mode, this line is set when a memory (ZAC) command is received from the adapter and remains set until either the requested read data is transferred or status is returned from the memory module. |
| CDR | The channel data ready line extends from the module 300 to the adapter and when set indicates that the module 300 is ready to accept more data or commands from the adapter. |
| EDT | The end data transfer line extends from the module 300 to the adapter and is used during Auto data transfer operations in indirect mode to indicate that the last word of data has been transferred (Write) or that the last word of data has been stored (Read). |
| DFA | The data from adapter lines are 40 lines which extend from the controller adapter to module 300 used to transfer data including status memory addresses, commands, to module 300. |
| PIDFA | The port identifier from adapter lines are two lines from the adapter to module 300 used in conjunction with the interrupt lines to indicate which support on the controller adapter caused the interrupt. |
| ADFA | The accept data from adapter line extends from the adapter to module 300 and when set indicates that data or memory command is applied to the DFA lines and should be accepted by module 300. |
| AD-BUSY | The adapter PI busy line extends from the adapter to module 300 and when set indicates that the adapter has accepted a PI command and is not capable of accepting any more commands. |
| ADR | The adapter data ready line extends from the adapter to the module 300 and when set indicates to the channel that the adapter is ready to accept more data. |
| IFA | The interrupt from adapter lines are four lines which extend from the controller adapter to module 300 and indicate the type of interrupt requests (i.e. generates EV4-EV7 signals applied to block 301-34). |
| TFA | The terminate from adapter line extends from adapter to module 300 and when set indicates the termination of a data transfer operation to module 300. |

It will be appreciated that the controller adapter interface includes other lines required for performing other functioning such as initializing, enabling, etc.

Output signals from switch 302-4 are applied to a further two position selector switch 302-6 which also receives data signals applied to the lines DFA by the controller adapter associated therewith. During a data transfer operation, the output signals from the DFA position of switch 302-6 are loaded into different ones of the four 40 bit data registers 302-8 for transfer to common section 301 via a four position switch 302-12 or to the controller adapter via a two position selector switch 302-10. Additionally, output signals from WD switch 302-4 are transferred to the controller adapter via the WD position of switch 302-10. Different ones of the registers 302-8 are selected for loading and unloading by the address signals stored in read and write address registers of block 302-14 which are modified by signals generated by the circuits of block 302-7. Also, these WA and RA registers supply signals indicative of the number of words stored which are used to determine the status of a transfer operation.

During a data transfer operation, the parity check and generation of circuits block 302-14 are operative to check the parity of the data signals received from the controller adapter via switch 302-6 and generate appropriate parity as required. It is also seen that switch 302-4 receives signals from the first pair of channel write data registers (W Reg O, W Reg 1) which store two words of information for transfer from H switch 301-42 to either the registers 302-8 or directly to the controller adapter via the selector switch 302-10.

DETAILED DESCRIPTION OF SECTIONS 301-4 AND 301-34

Figure 4C:
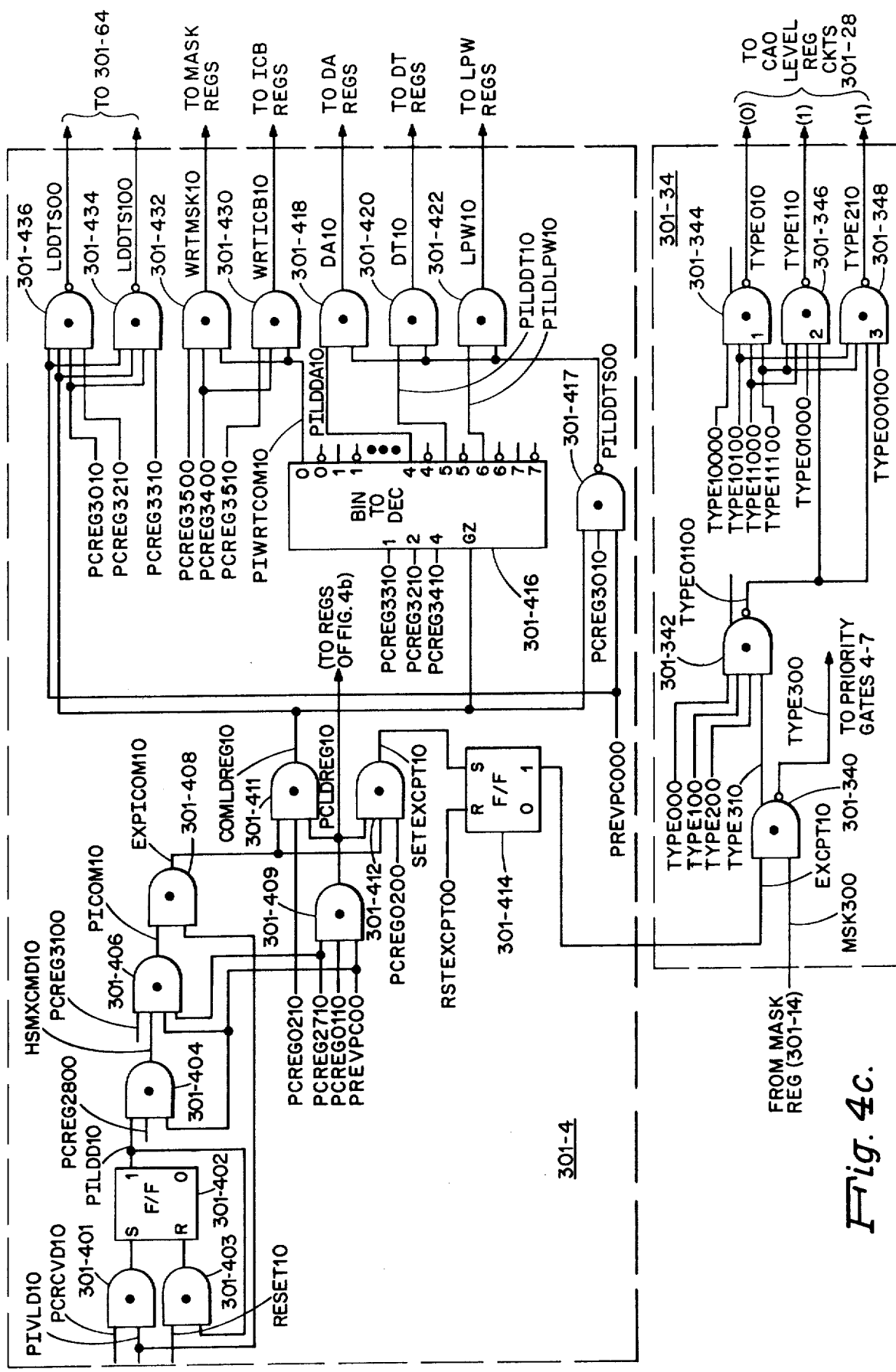
Figure 4D:
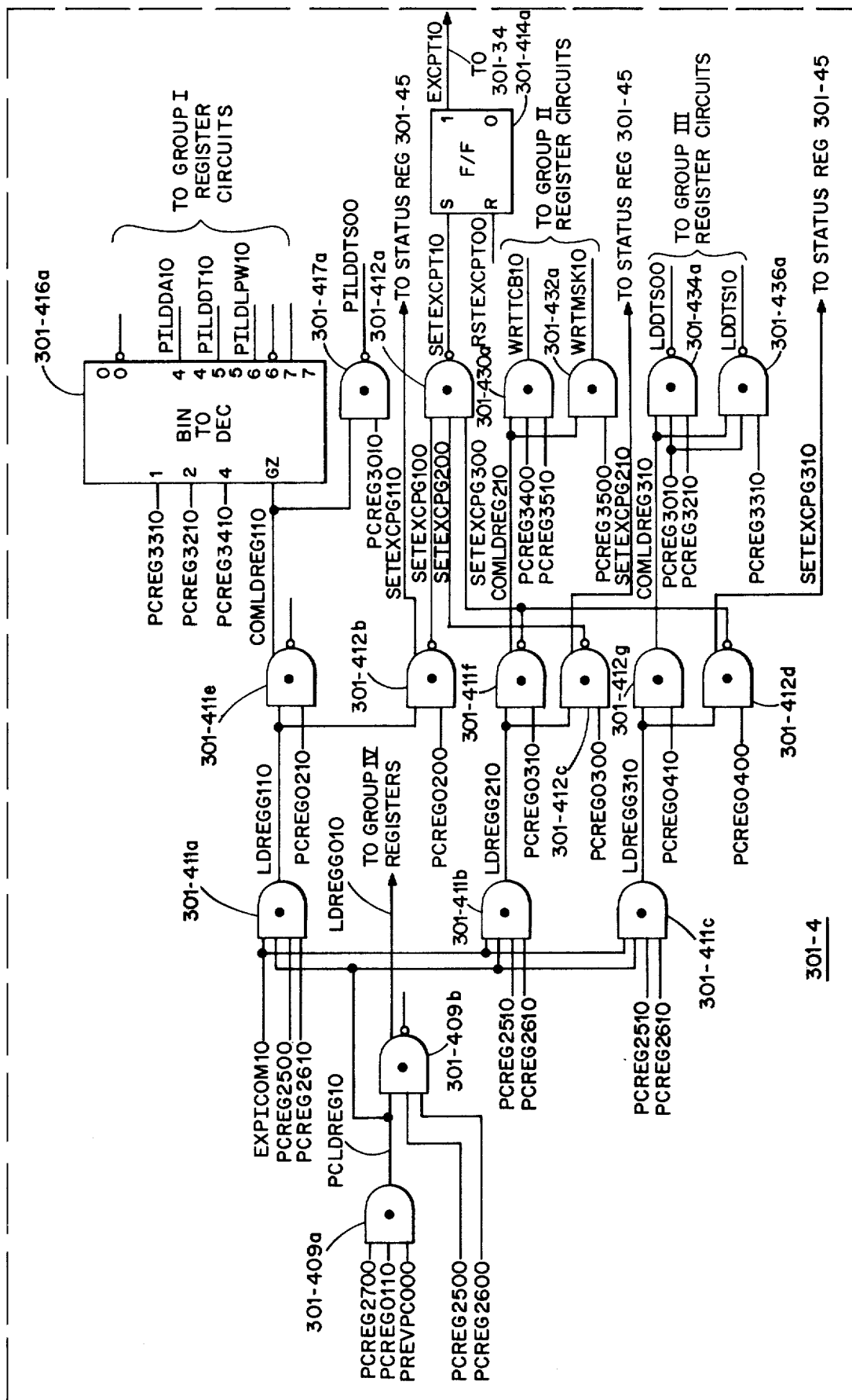

FIGS. 4c and 4d illustrate different embodiments of a portion of the circuits included within blocks 301-4 and 301-34 constructed in accordance with the principles of the present invention. Referring first to FIG. 4c, it is seen that the circuits of block 301-4 include flip-flops 301-402, and 301-414, a binary to decimal decoder circuit 301-416 and a plurality of NAND gates 301-417, 301-434 and 301-436 and AND gates 301-401, 301-404 through 301-412, 301-418 through 301-422, 301-430 and 301-432 arranged as shown.

Figure 7A:
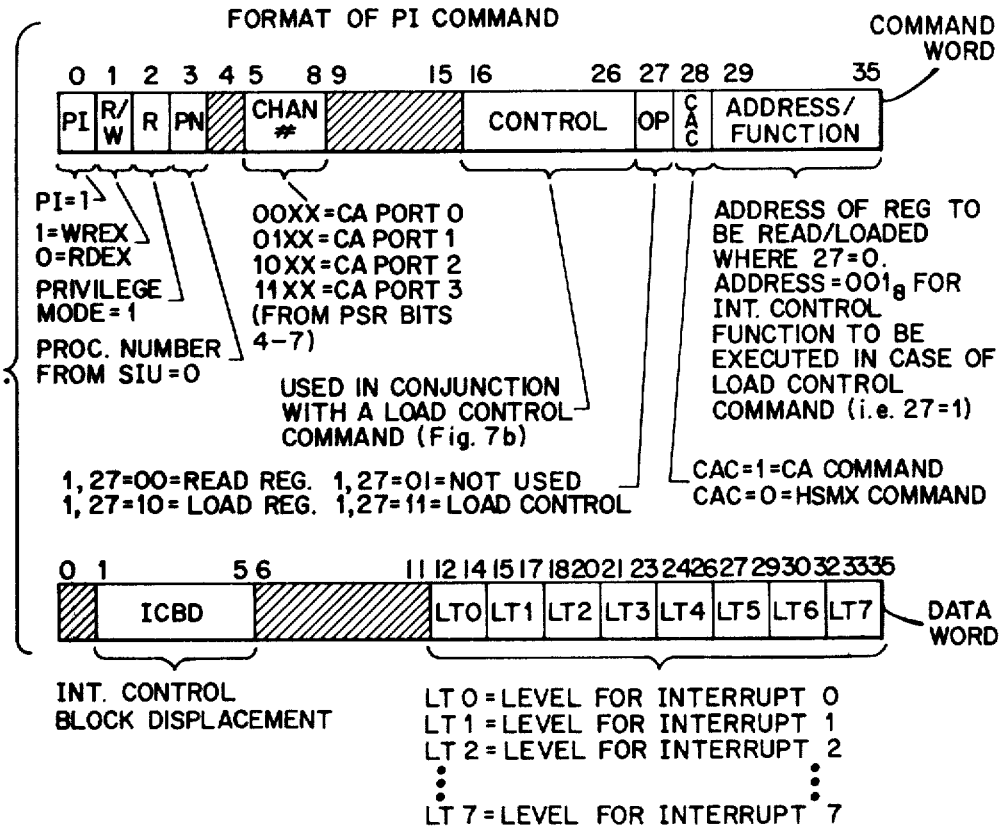
FIGS. 7a through 7c illustrate the format of different commands used in connection with the multiplexer module 300 of FIG. 1.
Figure 7B:
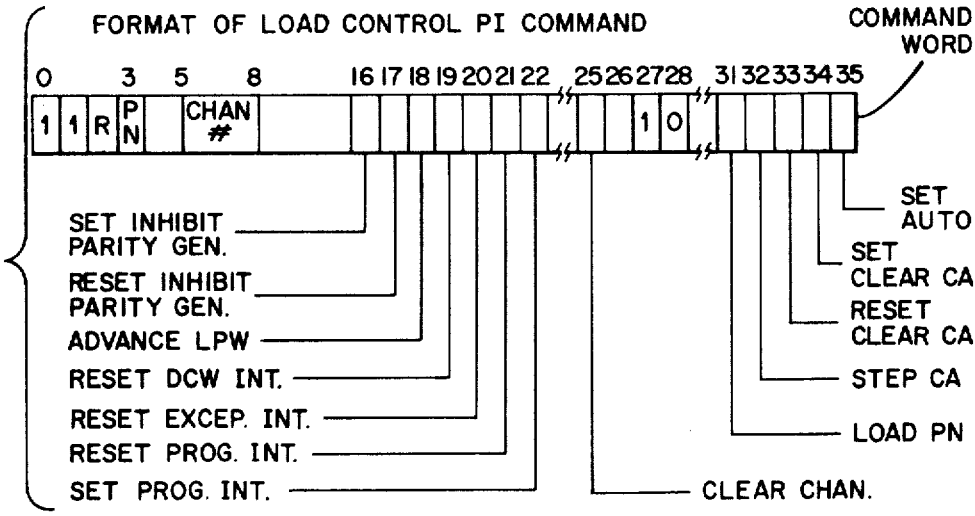
Figure 7C:
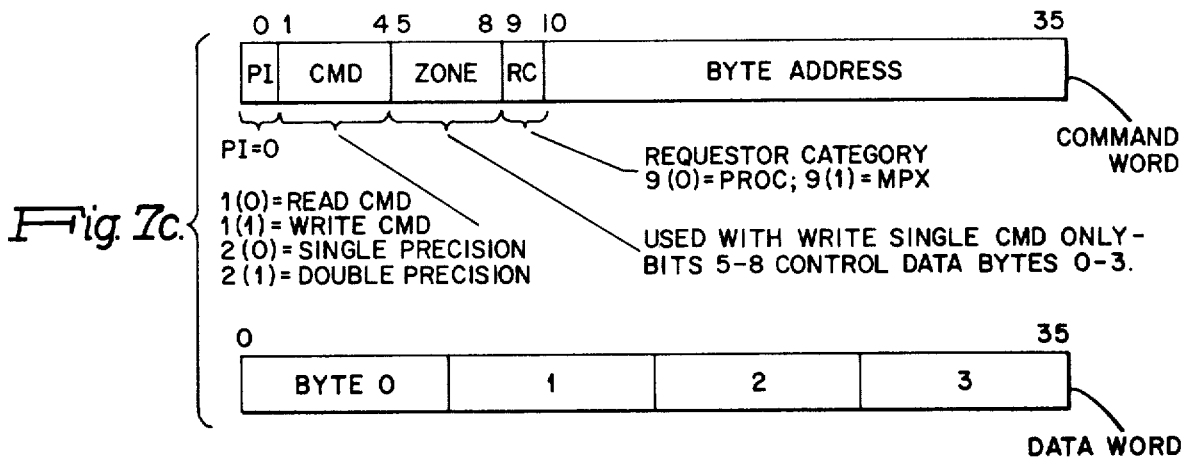

The flip-flop 301-402 is switched to a binary ONE via AND gate 301-401 when a PI command has been received (signaled by raising the APC line which switches a flip-flop, not shown, to a binary ONE forcing signal PCRCVD10 to a binary ONE) and the command is valid (i.e. bit 0 of the command word illustrated in FIGS. 7a and 7b is a binary ONE) signaled when signal PIVLD10 is a binary ONE. The AND gate 301-404 forces signal HSMXCMD10 to a binary ONE when bit 28 of the PI command word is a binary ZERO signaling that it is a command to be executed by the high speed multiplexer and not a channel. The AND gates 301-406 and 301-408 force an external PI command signal EX-PICOM10 to a binary ONE when the command word specifies a register operation (i.e. bit 27 is a binary ZERO and bit 31 is a binary ZERO).

The AND gate 301-409 forces a load register signal PCLDREG10 to a binary ONE when the command word does not specify a load previous contents command (i.e., signal PREVPCO1 is a binary ONE) but is a load register command (i.e. bits 1 and 27 are a binary ONE and a binary ZERO respectively). c, define As indicated, the PCLDREG10 signal is forwarded to each of the registers whose contents can be modified by user or slave programs. In the preferred embodiment, as discussed in greater detail herein, these registers primarily store data in response to user instructions. Hence, the loading of these registers proceed on an unrestrictive basis.

Additionally, a signal PCLDREG10 is applied to AND gate 301-411 which combines it with external PI command signal EXPICOM10 and a restrictive bit signal PCREGO210 generated by bit 2 of the PI command word. The AND gate 301-411 forces a command load register signal COMLDREG10 to a binary ONE when bit 2 is a binary ONE. As seen from FIG. 4c, the COMLDREG10 signal is applied as an enabling signal input to binary to decimal circuit 301-416 which also receives a three bit code corresponding to bits 32–34 of the PI command word. As explained herein in greater detail, bits 29 through 35 define a three digit octal register number. Bit 29 defines the first octal digit, bits 30–32 defines the second octal digit and bits 33–35 define the third octal digit. Additional decoding gate circuits are required because it is necessary also to provide the appropriate control signals to the different switches for loading the designated register (e.g., DT, PD switches).

The circuit when enabled by signal PCLDREG10 forces a predetermined one of its outputs to a binary ONE. The different outputs produce load register signals PILDDA10, PILDDT10 and PILDLPW10 which are applied to different ones of restricted registers 301-46 via the AND gates 301-418, 301-420 and 301-422. A different one of these signals are generated in response to different groups of binary octal coded signals applied to circuits 301-416.

The AND gate 301-418 when enabled by signal PILDDTSOO from NAND gate 301-417 switches its output terminal to a binary ONE when signals PCREG3410, PCREG3210 and PCREG3310 have an octal value of "4" specifying the address of the DA register. AND gates 301-420 and 301-422 switch their output terminals to binary ONES when signals PCREG3410, PCREG3210 and PCREG3310 have octal values of 5 and 6. The NAND gate 301-417 is enabled when signal PC3010 is a binary ZERO defining that the second octal digit has a value less than 4. In a similar fashion, AND gates 301-430 and 301-432 switch their output terminals respectively to binary ones when signals PCREG3410, PCREG3210 and PCREG3310 have an octal value of 0 which conditions circuit 301-416 to force signal PIWRTCOM10 to a binary ONE. The signals PCREG3500 and PCREG3510 from the PC command register 301-2 select between registers having octal address numbers of 000 and 001 corresponding to bits 29-35 of the PI command of FIG. 7a.

The pair of NAND gates 301-434 and 301-436 provide different coded combinations of signals LDDTS00 and LDDTS10 which are applied to inverter input circuits of the register bank 301-64. This enables selection of one of the four registers designated by register numbers 042, 046, 052 and 056. The signals PCREG3010, PCREG3210 and PCREG3310 corresponding to the second and third octal digits provide the proper register selection. At this time, signal PCREG3010 inhibits NAND gate 301-417 from forcing signal PILDDTS00 to a binary ONE. The AND gate 301-412 forces a set exception signal SETEXCPT10 to a binary ONE in response to signals PCLDREG10 and EXPICOM10 when the complement of the restrictive bit signal PCREGO210 is a binary ONE. Flip-flop 301-414 in response to signal SETEXCPT10 switches signal EXCPT10 to a binary ONE. The exception signal is applied to block 301-34 for processing. The flip-flop 301-414 is switched to a binary ZERO by signals RSTEXCPTCO in response to a PI command.

As seen from FIG. 4c, section 301-34 includes a plurality of NAND/AND gates 301-340 through 301-348 arranged as shown. The gate 301-340 forces a type 3 interrupt signal TYPE310 when the mask signal MSK300 from the selected mask register is a binary ONE. At the same time, the gate 301-340 forces signal TYPE300 to a binary zero inhibiting other priority encoding gates arranged similar to gates 301-344 through 301-348.

The gate 301-342 combines the TYPE310 signal with other fault signals to force type 3 signal TYPE01100 to a binary ZERO in the absence of higher priority interrupts (e.g., COMFAULT etc.). The type 3 signal type 01100 conditions encoder NAND gates 301-344 through 301-348 to generate a type 3 code of "011". The output signals TYPEO10, TYPE110 and TYPE210 are applied to CAO level circuits 301-28.

FIG. 4d illustrates another embodiment of the circuits of block 301-4. The same number designations are used to indicate gates which perform functions similar to those of FIG. 4c. It will be noted that bits 25 and 26 of the PI command word are used to define a particular class of restrictive register as explained herein in greater detail. When bits 25 and 26 are both binary ZEROS, AND gate 301-409b in response to AND gate 301-409a forcing signal PCLDREG10 to a binary ONE forces load register signal LDREGG010 to a binary ONE. This signal is applied to non-restrictive registers designated as group IV.

When bits 25 and 26 are coded as "01", AND gate 301-411a forces a second load register signal LDREGG110 to a binary ONE. When bit 2 of the PC register is a binary ONE, AND gate 301-411e forces signal COMLDREG110 to a binary ONE which conditions the binary to decimal circuit 301-416a to generate individual load control signals for group I registers. Also, the NAND gate 301-417a generates signal PILDDTS00 whch is combined with the load signals in the manner illustrated in FIG. 4c.

Similarly, when bits 25 and 26 are coded 10, the AND gates 301-411b through 301-432a generate the load control signals for group II registers. Lastly, when bits 25 and 26 are coded 11, the AND gates 301-411c and 301-412g together with NAND gates 301-434d and 301-436d generate the load control signals for group III registers.

As concerns exception signals, the AND gates 301-412b, 301-412c and 301-412d apply exception signals to a common OR gate 301-412a when corresponding ones of the bit positions 2-4 of the PC register are set to binary ZEROS. This produces the set exception signal 301-412a which conditions exception flip-flop 301-414a whose binary ONE output is applied to block 301-34. The flip-flop 301-414a is a reset via a PI command which forces signal RSTEXCPT00 to a binary ONE. Additionally, the individual exception signals are applied to status register 301-45 for storing signals identifying the type of register violation. In the embodiment of FIG. 4c, this was not necessary since the type of interrupt provides information which identifies the interrupt as a register violation.

Figure 6:
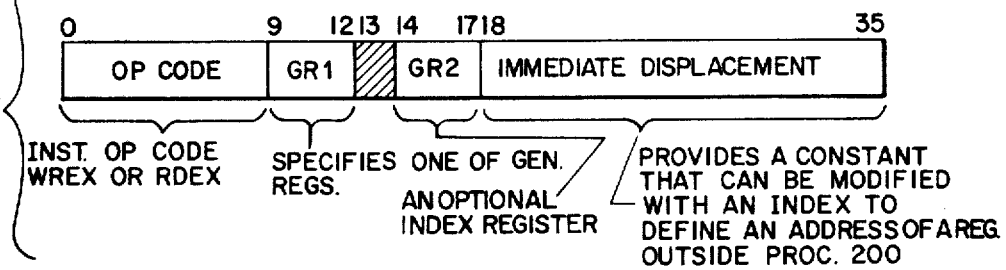
FIG. 6 illustrates a first format of the WREX and RDEX program instructions.

Before describing the operation of the present invention, reference will be made to FIGS. 7a and 9a through 9c. These figures show the formats of PI commands and process state register for the embodiments of FIGS. 4c and 4d. FIG. 7a illustrates the format of the PI command used in the embodiment of FIG. 4c. The PI command is generated by processor 200 in response to a WREX instruction having the format of FIG. 6. For further information describing in detail the generation of the PI command, reference may be made to the patent applications titled "Steering Code Generating Apparatus for Use in an Input/Output Processing System" and "Programmable Interface Apparatus and Method" which are referenced as related applications in the introductory portion of this specification.

From FIG. 7a, it is seen that bit 0 is set equal to ONE to define a PI command word. Bit 1 is supplied by the contents of the CSR register of processor 200 is set to ONE and ZERO respectively to define a write external register (load) and read external register (read) operation. Bit 2 which corresponds to bit 9 of the PSR register of FIG. 9a defines whether the current program can alter the contents of certain external registers in accordance with the present invention as explained herein. Bit 3 is set equal to the processor pair number supplied by the SIU 100 while bit 4 is normally a binary ZERO.

Figure 9A:
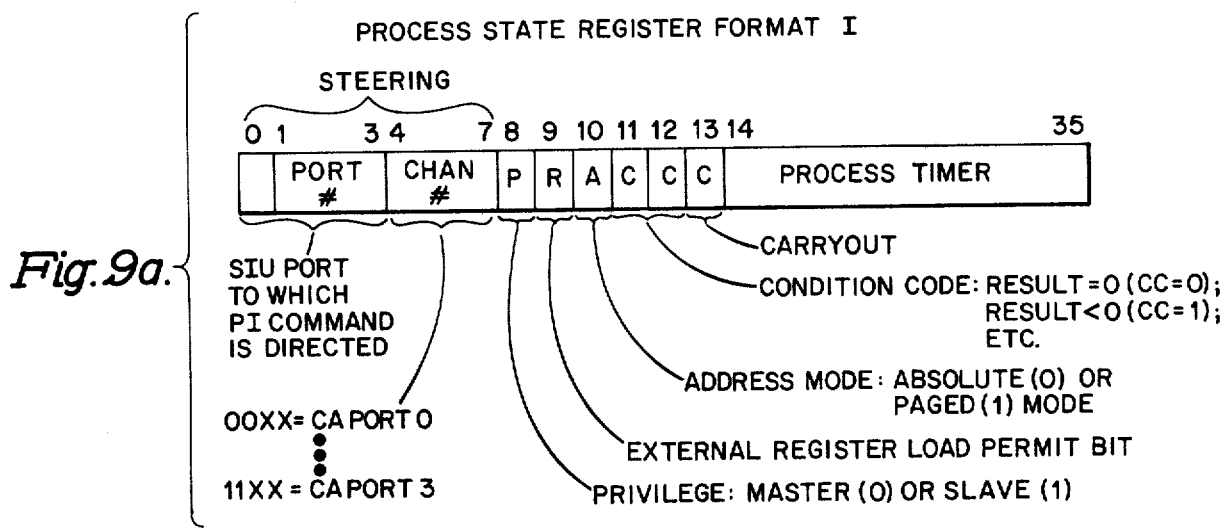
FIGS. 9a and 9b illustrate the different formats of the process state register in accordance with the present invention.

Bits 5-8 are set equal to bits 4-7 of the PSR register and define the port within the multiplexer being addressed. Bit 27 in the case of a load register operation is set to a binary ZERO while bit 28 is also set to a binary ZERO for defining when the command is a multiplexer command. As mentioned previously, bits 29-35 define a three digit octal address of a register to be loaded or read. The octal addresses for these registers are given in FIGS. 7d and 7e. FIG. 9a as mentioned shows the format of the PSR register. As discussed above, bits 0-7 furnish certain steering information which include bits 5-8 of the PI command. Also, the steering information is loaded into the steering register 204-16 of processor 200 enabling proper transfer of the PI command. Bit 9 is the external register load permit bit which is furnished to bit 2 of the PI command. The remaining bits serve the functions mentioned previously. Since they are not pertinent to the present invention, they will not be discussed further.

Figure 9B:
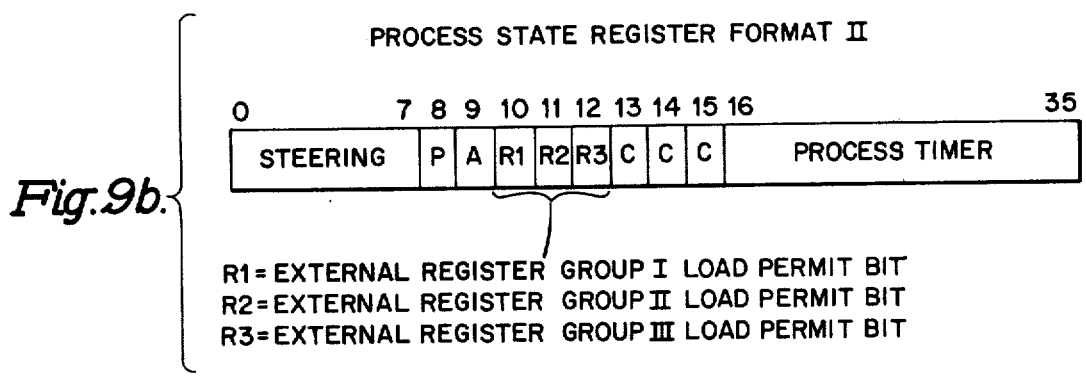
Figure 9C:
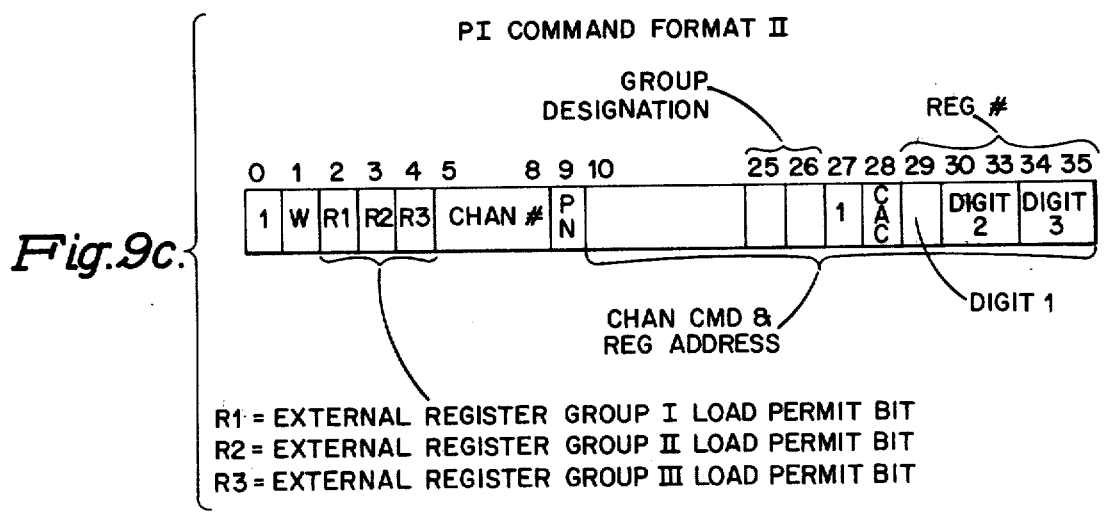
FIG. 9c illustrates another format of the PI command in accordance with the present invention.

FIG. 9c illustrates the format of the PI command used by the embodiment of FIG. 4d. It is seen that bits 2 through 4 correspond to bits 10 through 12 of the PSR register of FIG. 9b and define those types of registers which a current program can alter in accordance with the present invention. More specifically, the registers of multiplexer 300 are divided into four groups. The first group of registers (group I) correspond to those multiplexer registers listed in FIGS. 7d and 7e that contain absolute memory addresses needed during the execution of an input/output data transfer operation. As explained herein, the loading of these registers are restricted to a highly privileged program such as an input/output supervisor program. That is, only that type of program will be able to set bit 2 (R1) to a binary ONE as explained herein. This ensures that the security of the system is maintained. This will be discussed herein in detail with reference to FIGS. 10a and 10b.

Bits 25 and 26 are used to define each group and when coded 01 define group I registers. When bits 25 and 26 are coded 10, they define a second group of registers (Group II). These registers contain interrupt information (e.g., interrupt vector addresses, priority levels etc.) which is used during a hardware generated interruption of processor 200. In the preferred embodiment, the loading of these registers are restricted to a high priority program such as the input/output processor control supervisor program to ensure system security as explained herein. Thus, only this type of program will be able to set bit 3 (R2) to a binary ONE.

The next class of registers are specified when bits 25 and 26 are coded 11. These registers are not directly loaded during the execution of an input/output program but are used to facilitate diagnosis of channel failures. In the present embodiment, the loading of these registers are restricted to test and diagnosis programs. Thus, only this type of program will be able to set bit and (R3) to a binary ONE.

The last class of registers are specified when bits 25 and 26 are coded 00. These registers are used by channel control programs and have no loading restrictions. As mentioned previously, these registers store data in response to user/slave programs. Of course, bits 2-4 are not required to be set to binary ONES.

The other bits of the PI command such as bits 0, 1 and 27 through 35 are formatted as the PI command of FIG. 7a. Bit 9 contains the same information as bit 3.

FIG. 9b shows the format of the PSR register used in conjunction with the PI command of FIG. 9c. With the exception of bits 10-12, the remaining bits are coded as those of FIG. 9a. Bits 10-12 are used to supply bits 2-4 of the PI command of FIG. 9c. Unused bits of the process timer field are used to supply the two additional required external register load permit bits.

DESCRIPTION OF OPERATION

With reference to FIGS. 1 through 10b, the operation of the system of the present invention will now be described. First, the operation of the multiplexer 300 including the apparatus of FIG. 4c in accordance with the present invention will be described with reference to FIGS. 10a and 10b.

Figure 10A:
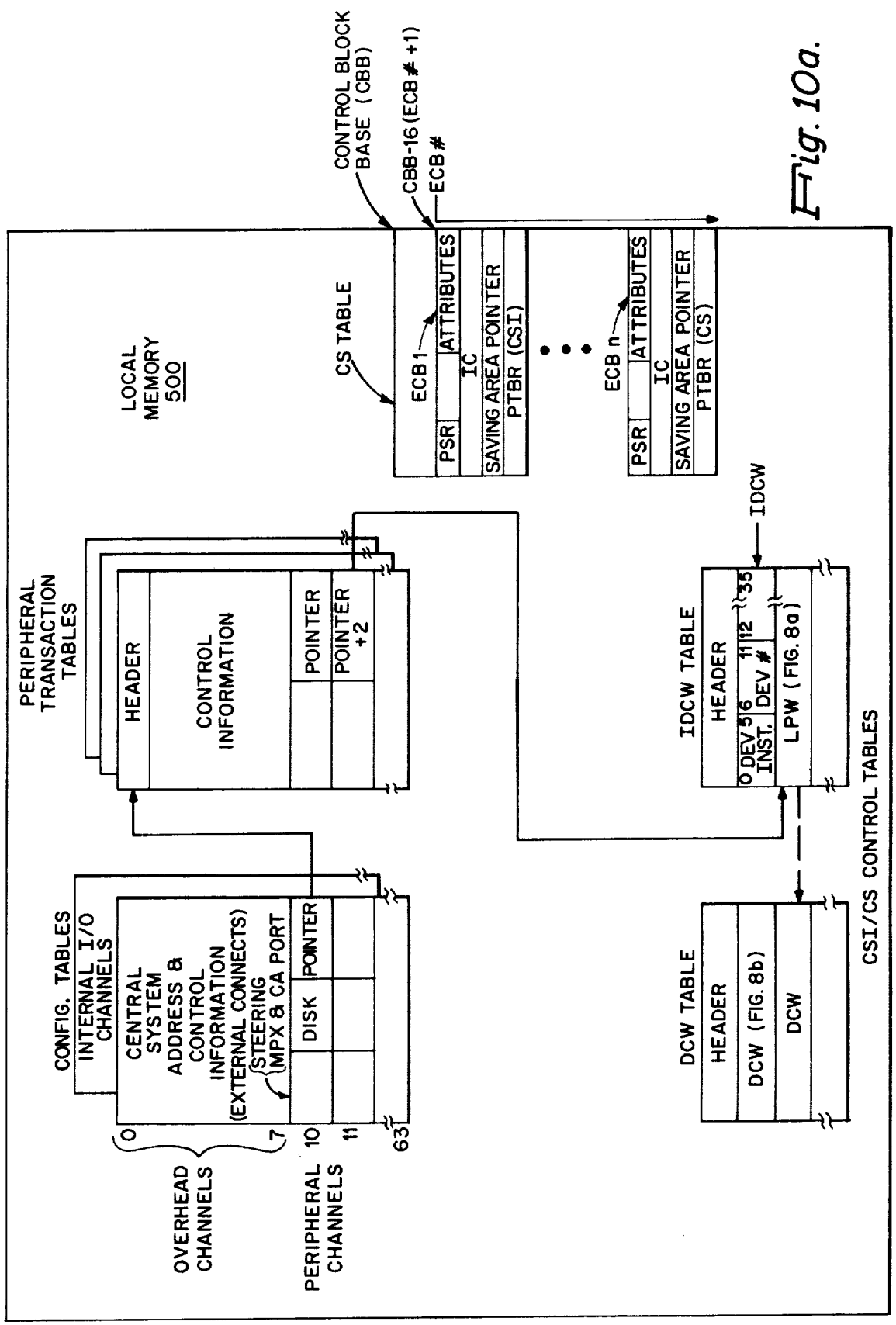
FIGS. 10a and 10b are system diagrams used in explaining the operations of the present invention.

FIG. 10a shows the different control tables which comprise the central system interface (CSI) software module. This module supervises all of the input/output activity handled by the processor 200 under the control of a number of device handler routines. Each of the device handler routines controls one or more physical channels. The module includes a collection of different routines arranged to provide central system communication and internal input/output communication. In general, the CSI supervises or controls all of the communication between the central system and processor 200 (initiated by host processor connect instructions) or between the different modules of the system of FIG. 1 (initiated by a predetermined sequence of instructions which make an entry in a queue in local memory 500 for dispatching later at a lower priority level). This includes the mapping of logical to physical channel numbers, the establishing of temporary tables (i.e., PTT, IDCW and DCW) associated with pending input/output operations and the transfer of control to the appropriate device handling routines for execution of the input/output operation. At the completion of the input/output operation, the device handler routine queues the resulting status and termination code signals for subsequent referencing by CSI routine. The CSI routine then passes the status back to the requestor user program and if applicable initiates termination of the interrupt process and completes the input/output transaction by releasing for other use the established temporary tables and lists.

The CSI routine utilizing the subsystem tables constructed by the control supervisor module constructs the control tables of FIG. 10a in its own memory space during system initialization. The tables are of the linked list type and are assigned upon the receipt of a host processor connect instruction and released to memory after receipt of termination status signals.

The central system configuration table includes up to 64 channels, the first eight of which are used to perform overhead operations such as responding to system faults and special interrupts not pertinent to the present invention. The remaining 56 channels are peripheral channels used in performing input/output operations. Each of the 56 channel entries of the configuration table include information to relate the channel number to peripheral device. By way of example, entry 10 specifies a disk device and includes information designating the multiplexer at port A and channel CA0.

Following the issuing of a connect instruction by the host processor, CSI stores pointer information in channel 10. Also, at that time, the CSI routine constructs the remaining tables which remain for the life of the transaction. It uses the peripheral transaction table to store memory pointers which point to the locations of control words in the main memory module used to reference lists of data control words. In the processing of constructing the peripheral transaction table, the CSI routine fetches from the main memory module the data control word list that is going to control the operation and stores it in local memory 500. During this operation, it separates the peripheral commands called instruction DCWs from the DCWs for each command. The CSI routine then constructs in memory 500 one instruction data control word table, four words in length. It saves one command in that table and relates the IDCW table by means of a LPW pointer to the other table (DCW) which stores the list of DCWs which are pointers to the information areas in memory. Subsequently, the LPW will be loaded into one of the LPW registers of multiplexer 300 as explained herein. The IDCWs and DCWs have the format shown in FIG. 10a and 8b respectively. Briefly, each IDCW includes a six bit device instruction code specifying the type of operation (e.g., read, write, seek, etc.) and a six bit device code specifying the particular device. Each DCW has two words, the first which includes control information and the second contains a word address.

By way of example, it is assumed that a disk device handler routine is dispatched to perform a read data transfer operation involving a disk device to controller adapter 303 which requires the loading of one of the LPW registers of FIG. 4a. The device handler routines are slave and are restricted in terms of registers. That is, whenever there is a fault or software problem in a device handler routine, the routine must not interfere with the operation of other routines or be able to gain unauthorized access to information thereby rendering the system insecure. The security of the system and protection of memory requires that each device handler routine not gain access to areas outside those allocated. Thus, those registers in the channels which control or manipulate absolute addresses must be controlled and verified by higher level programs designated as CSI and CS routines in FIG. 10b. Accordingly, these registers which include the LPW register are defined as restricted in FIG. 7c and only a program which has proper authorization to load the register is permitted to load the register. The CSI program includes a master mode routine which performs dispatching operations and directly controls the device handler routines. In a first embodiment, it supervises the loading of the restricted registers in order to maintain the security of the system.

When an I/O connect instruction is issued by the host processor to processor 200, this causes an interrupt. The processor 200 in response to the interrupt enters the CSI routine via an ICB. The CSI routine examines the command and dispatches the appropriate device handler routine.

Before dispatch takes place, the CSI routine sets up the required parameters which are passed to the disk device handler routine and stored in four general registers. Certain parameters are stored in GR10 of the appropriate process level (i.e., interrupt level 5). The first 15 bit positions of GR10 store the peripheral transaction table address, the next 4 bit positions store the source (e.g., central system), the next 11 bit positions store a device identification code while the next 6 bit positions store a device handler identification code which corresponds to a subsystem number, a different one of which is assigned to every program loaded. The CSI routine fetches the first IDCW and loads it into GR12. Other parameters are stored in GR11 and GR13.

When the disk device handler routine accepts the IDCW from GR12, it decodes the command and finds it to be a data transfer command and it establishes that the operation requires the loading of the LPW register. When it detects that it is a read data transfer the processor 200 executes a sequence of instructions to determine the availability of the device specified by the IDCW. When it determines the device is available, it loads an action code into GR13. Prior to entering the CSI routine, the device handler routine loads different ones of its general registers. As mentioned, it loads GR13 with a code specifying the action to be taken by CSI (i.e., a code of 01 is used to specify the loading of a LPW register in multiplexer 300). A copy of GR10 initially passed to the device handler routine at the time of connection and stored in memory 500 is at this time fetched. It is then stored in GR10 and serves as an identification code for the CSI routine. It will be noted that the information to be loaded into the register is not passed to the device handler routine. It then executes a master mode entry instruction to call the CSI routine.

The master mode process (CSI) is entered through an exception control block (i.e., ECBl) designated by the least significant four bits of an immediate operand field of the master mode entry instruction (i.e. bits 10-13 of the instruction having a format which includes an 8 bit op code field, a 4 bit immediate value field and a 4 bit general register field). For further information regarding the formats of these instructions, reference may be made to the application titled "Processor for Input/Output Processing System" referenced as a related application.

From FIG. 10a, it is seen that local memory 500 includes a number of exception control blocks maintained by the CS routine, each having the format shown. In greater detail the ECB has four words. The first word has a format of the PSR register and defines the attributes of the CSI routine specified by the fourth word. In the example, as shown in FIG. 10a, bits 9 and 10 of the first word are both ONES. This means that the CSI routine can load restricted registers. Bit 10 indicates that the operation is paged.

In the present embodiments, the contents of each of the ECBs are loaded by the CS routine during system initialization. In general, the CS routine references other tables it maintains and loads the attributes listed in the tables for each routine into different ones of the ECBs.

During the execution of the master mode entry instruction, the processor 200 stores the contents of the PSR register in one of the general registers and loads the PSR information obtained from the exception control block (word 1). The processor 200 also stores additional information about the current process (e.g. IC, GR2, GR3, etc.).

The CSI routine whose location specified by word 4 of the ECB is referenced. The routine selects the appropriate peripheral transaction table by the device handler identification code. From there, the CSI routine using the pointer to the corresponding IDCW table accesses the information therefrom. Next, the CSI routine executes an WREX instruction having the format of FIG. 6 to load the information into the LPW register of multiplexer 300 as explained herein. Since the device handler routine already had the appropriate steering information loaded into the PSR register when the call was made, the CSI routine does not have to determine the physical channel to address. Also, the restrictions associated with the LPW register have been loaded into the PSR register.

As explained above, the processor 200 of FIG. 2 upon execution of an WREX instruction generates a PI command having the format of FIG. 7a. In greater detail, the GRI field of the WREX instruction is coded to specify which one of the general registers of scratch pad memory 203-10 contains the address information to be loaded into the LPW register whose address is designated by the address field.

The op code of the WREX instruction is applied by switch 202-4 to memory 201-2 causing it to reference one of the locations. The contents of the location include a pair of addresses specifying starting addresses in control store 201-10 of the microinstruction sequences required for instruction processing. Under microprogram control, the address field of the WREX instruction is applied to the B operand inputs of adder/shifter 204-2 while the ZERO contents of the scratch pad buffer are applied to the A operand inputs. The sum corresponding to the address field of the PI command word of FIG. 7a is transferred to working register R2.

Next, the general register location specified by the GRl field is addressed and the contents are read out into buffer 203-16. During the execution phase of the WREX instruction, the PI command formatted in the R2 register is loaded into the data out register 204-14. Additionally, under microprogram control, processor 200 loads signals from register 201-15 and PSR register 204-20 into bit positions 0-8 of the steering register 204-16. These signals provide the necessary steering information to the SIU 100 for transfer of the PI command to the multiplexer 300 or to the port (i.e., port A) to which the multipleer connects.

The processor 200 forces the AOPR line to a binary ONE and delays execution of the next microinstruction until it receives a signal via the ARA line indicating acceptance of the request by the SIU 100. Assuming acceptance, the SIU 100 forces the ARA line to a binary ONE. Simultaneously, the SIU 100 forces the APC line to a binary ONE signaling the multiplexer 300 to accept the PI command.

Figure 8A:
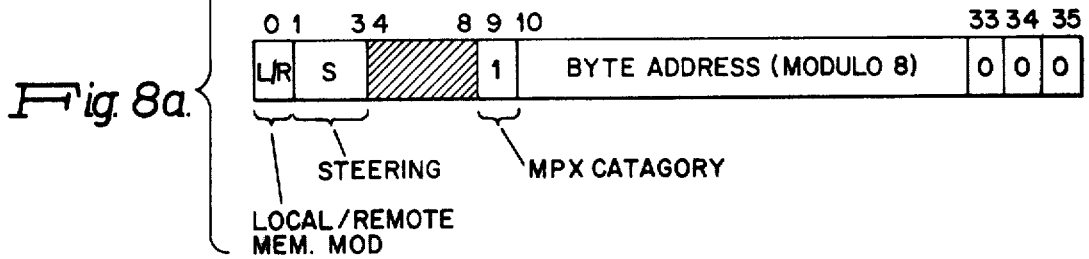
FIGS. 8a and 8b illustrate the formats of certain channel control words.
Figure 8B:
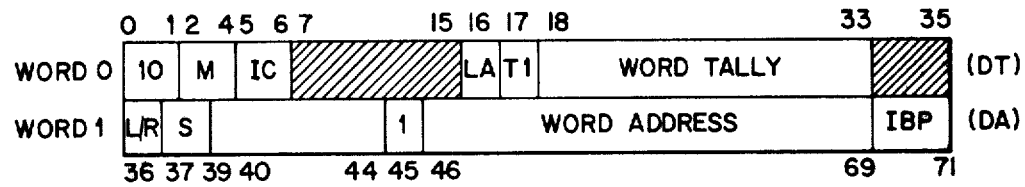

Referring to FIG. 4c, the ACA line when a binary ONE causes signal PCRCVD10 to be switched to a binary ONE. Also, the PI command word is loaded into PC register 301-2 via the PDFS lines. Upon detecting a change in state on the ARA line, processor 200 under microinstruction control completes processing of the WREX instruction by transferring the LPW data word formatted as shown in FIG. 8a from buffer 203-16 to data out register 204-14. The LPW word is loaded into the PD register 301-5 via the PDFS lines.

The gate circuits of FIG. 4c decode the PI command word and force signals EXPICOM10 and COMLDREG10 to binary ONES. The circuit 301-416 enabled by signal COMLDREG10 decodes the address signals corresponding to bits 32-34 of the command word and force signal PILDLPW10 to a binary ONE. This signal in turn enables the LPW register to be loaded with the contents of PD register 301-5.

It will be appreciated that the different switches such as PD, H and CW are appropriately enabled by circuits, not shown, which also decode the address signals of the PI command word. For example, signal PILDDTSOO is a binary ONE and the DT switch is not enabled while the other switches mentioned are enabled. Since in this example, the loading of the LPW register is authorized, signal PCREG0200 is a binary ZERO. Therefore, the exception flip-flop 301-414 remains in its binary ZERO state.

It can be seen that if for example the device handler routine attempted to execute a WREX instruction which contained an address field specifying the LPW register as the register to be loaded, bit 2 obtained from the PSR register would be set to a binary ZERO. In that case, load signal CDMLDREG10 would remain a binary ZERO preventing circuit 301-416 from being enabled. This in turn would inhibit the loading of the LPW register. Also, signal PCREG0200 would be a binary ONE causing AND gate 301-412 to force the SETEXCPT10 signal to a binary ONE switching flip-flop 301-414 to a binary ONE.

The exception signal EXCPT10 conditions the circuits of block 301-34 to generate a type 3 interrupt when there are no other higher priority interrupts present. These signals select the appropriate level signals from the circuits of block 301-28 which are applied to interrupt level priority network 301-24.

The level and type signals for channel zero (CA0) are then loaded into register 301-22 along with the other interrupt information. Also, at that time, interrupt request flip-flop 301-21 is switched to a binary ONE by circuits, conventional in design, of block 301-34. Since the type 3 interrupt normally designates the occurence of an exception, no further status is required to be sent by multiplexer 300 to processor 200.

From the foregoing, it will be appreciated that only those routines which have been assigned attributes enabling unrestrictive use of the multiplexer registers can load the registers. In the embodiment just described, there is only one class of restricted registers. By contrast, FIG. 4d illustrates apparatus for enforcing a number of classes of restrictions associated with different ones of the restricted registers of FIG. 7d. These restrictions will now be described with reference to FIG. 10b.

Figure 10B:
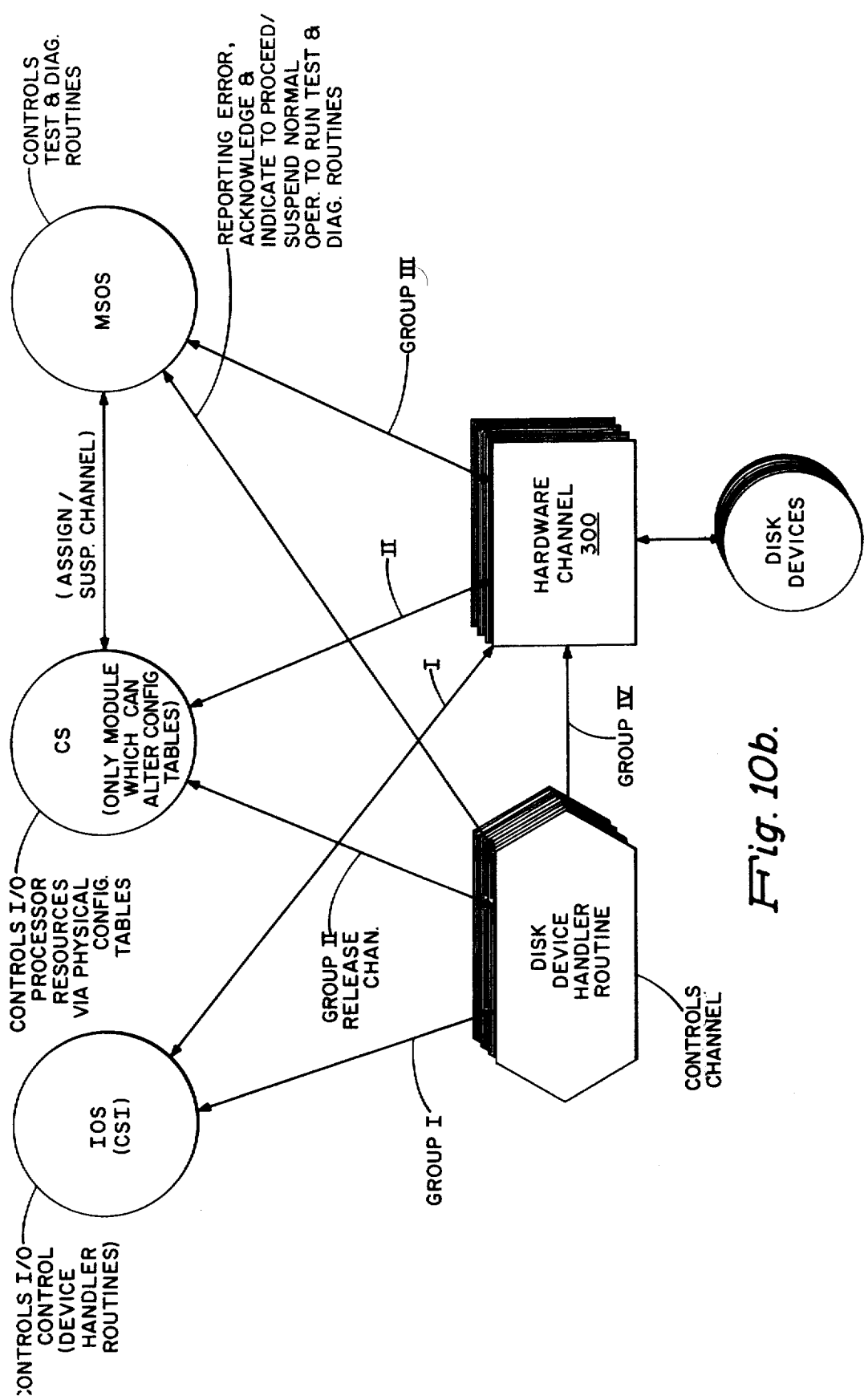

FIG. 10b illustrates diagramatically the different classes of registers and which control routines are assigned attributes for controlling the loading of same. As shown in FIG. 10b, the CSI routine controls the loading of Group I registers which as mentioned above store 35 memory addresses. These registers correspond to the LPW, the DA and DT registers 301-46 of FIG. 4a. The control supervisor (CS) routine controls the loading of the Group II registers which as mentioned above, store information required for interrupt processing such as interrupt vectors and interrupt priority levels. These registers correspond to the ICB registers 301-10, the level registers 301-12 and the mask registers 301-14 of FIG. 4a. The maintenance system (MSOS) routine controls the loading of Group III registers which information used for running test and diagnostic operations. These registers correspond to the ZAC, PDTS, DATA 1 and DATA 2 registers of register bank 301-64 of FIG. 4a. Lastly, as indicated by FIG. 10b, the device handler routines such as the disk device handler routine, control directly the loading of Group IV registers which normally store data manipulated by user programs requiring no loading restrictions. These registers correspond to the different registers of block 302 of FIG. 4a.

The control supervisor (CS) routine assigns the attributes to each of the other routines even though the CS routine only controls the loading of Group II registers. That is, the CS routine could control the loading of all of the restricted registers of multiplexer 300. As explained previously, the attributes assigned to the different ones of the routines are included in the first word of each of the exception control blocks of FIG. 10a, loaded at initialization time by the CS routine. The routine to be referenced as a consequence of exception processing is designated in word 4 of the exception control block.

The manner in which the Group I registers are loaded essentially corresponds to that described in connection with FIG. 10a. The differences relate to the formats of the PSR register and PI command. Specifically, the attribute signals corresponding to the first word of ECB1 of FIG. 10a include three load permit bits rather than one. Accordingly, when processor 200 issues a PI command in response to the WREX instruction, it has the format of FIG. 9c.

The PI command words are transferred to the multiplexer 300 in the same manner described above and stored in PC register 301-2 and PD register 301-5. The circuits of FIG. 4d operate to decode the command word which results in AND gate 301-411e forcing signal COMLDREG110 to a binary ONE. This enables circuit 301-416a to decode signals PC3210 through PC3410 which results in forcing one of the load signals of the Group I registers to a binary ONE (e.g., register code of 013 forces the LPW load signal PILDLPW10 to a binary ONE). Also, the exception flip-flop 301-414a remains in its binary ZERO state.

It is seen that if a different restrictive bit code were designated by the PI command and the same register code was specified, no Group I register load signals would be generated. Also, the AND gate 301-412b forces signal SETEXCPG100 to a binary ZERO switching exception flip-flop 301-414a to a binary ONE. Simultaneously, the gate 301-412b forces signal SETEXCPG110 to a binary ONE switching a predetermined one of the bit positions of status register 301-45 to a binary ONE. This indicates to the system the particular type of register violation. The contents of the status register 301-45 are read.

The other gates of FIG. 4d operate in a similar manner to generate load register signals for the other restricted registers only when the routines issuing the PI commands have the appropriate permit bits set to binary ONES. Upon detecting a violation, these circuits inhibit the generation of the loading signals, set the appropriate bit positions of status register 301-45 and switch exception flip-flop 301-414a to a binary ONE.

Since Group II registers deal with interrupt information, these registers are normally loaded by the CS routine as part of a load operation. That is, the CS routine is first loaded into local memory 500. Once loaded, it creates various tables after which the CSI routine is then loaded. Next, the device handler routines are loaded. Once loaded, the device handler routine executes an initialization routine during which it calls the CS routine via a master mode entry instruction requesting the CS routine to load the Group II registers. Before executing the master mode entry instruction, the device handler routine loads general register 14 with information indicating which register to load and loads general register 8 with the steering information required for identifying the channel (i.e. PSR bits 0–7).

As explained above, control is transferred to the CS routine which is operative to execute an WREX instruction for loading the required interrupt information into Group II registers (i.e., register No. 001). As shown in FIG. 10a, the device handler routine would reference block designated ECB to accomplish the foregoing.

The last routine granted unrestricted access to certain registers (i.e., group III) of multiplexer 300 is the MSOS routine. Whenever there is a failure detected in a channel, this causes multiplexer 300 to interrupt processor 200. The processor 200 via an ICB enters the CSI routine which determines what channel program or device handler routine was being executed at the time and gives control to that routine enabling it to complete certain operations aborted as a consequence of the failure. At the completion thereof, an exception is generated wherein, the device handler routine calls the CS routine via a master mode entry instruction. Before the call, the device handler routine loads information into general register 13 indicating the reason for the failure and loads general register 14 requesting that control be given to the MSOS routine. The CS routine is operative to the contents of different ones of the general registers (PSR, IC and PTBR) to pass control to the MSOS routine instead of the request device handler routine upon return of control via a return from master mode instruction which causes a restoration of the process state that existed just prior to the occurrence of the last exception. Also, the CS routine saves information which identifies the requestor of the case (the device handler routine).

Since the CS routine had changed the information to be referenced in restoring the previous process state, control is passed to the MSOS routine. The MSOS routine is operative to examine the contents of general register 13 to determine whether it wants control of the channel immediately to run test and diagnostic programs. If it wants control of the channel immediately, the MSOS routine calls to the CS routine via a master mode entry instruction by generating an exception. The CS routine takes the information identifying the device handler routine. It then loads it into the pertinent general registers and executes a return from master mode instruction. This returns control to the device handler routine which requests the CS routine to release the channel. Upon being signaled of the release by the CS routine, the device handler routine signals the MSOS routine of the release.

The MSOS routine requests the CS routine to assign the channel to it to enable the running of test and diagnostic routines on the channel. At this time, the MSOS routine makes a request to the CS routine to load the interrupt control register (register No. 001) with the appropriate ICBD information for directing all interrupts back to the MSOS routine and not the device handler routine now specified. That is, only the CS routine is authorized to load this register since it is a GROUP II register.

In the manner previously desscribed, the CS routine executes an WREX instruction which generates a PI command for loading the interrupt control register of the channel. Upon the completion thereof, the CS routine returns control to the MSOS routine which can now control the channel directly. Since the MSOS routine is authorized access to the registers designated in Group III, it is able to load these registers as required for running test and diagnostic routines.

When the MSOS routine completes the running of test and diagnostic routines, it calls the CS routine and loads general register 14 with a request that control be transferred to the device handler. The CS routine by reversing the operations mentioned above returns control of the channel to the device handler routine. Upon receipt of control, the device handler routine requests the CS routine to again load the interrupt control register of the channel with the appropriate ICBD information so that now the interrupts will be directed back to that routine.

From the above, it is seen that the arrangement of the present invention ensures the security of the system by having the different routines of the system requiring modification of different registers within multiplexer 300 generate a call to the appropriate control routine which includes the necessary attributes for loading the restricted registers required for carrying out the particular input/output operation. This is provided through the utilization of exception control blocks which include the necessary attribute information (i.e., PSR of word 1). It will be appreciated that by altering the coding of the different PSR words of these blocks, the CS routine is able to control system security efficiently. Also as mentioned, the CS routine is able to alter the register restrictions in accordance with the demands of the system.

It will be appreciated to those skilled in the art that many changes to the system and embodiments illustrated without departing from the spirit of the present invention. For example, the formats of the commands and registers may be altered. Other changes which could be made to the system of the present invention without departing from its teachings will also be apparent to those skilled in the art.

To prevent undue burdening the description with matter within the ken of those skilled in the art, a block diagram approach has been followed, with a detail functional description of each block and specific identification of the circuits it represents. The individual engineer is free to select elements, and components such as flip-flop circuits, registers, selector circuits, multiplexers from the individual's own background or available standard references or documents referenced herein.

While in accordance with the provisions and statutes, there has been illustrated and described the best form of the invention known, certain changes may be made to the system described without departing from the spirit and scope of the invention as set forth in the appended claims and that in some cases, certain features of the invention may be used to advantage without a corresponding use of other features.

Having described the invention, what is claimed is:

1. In an input/output system for controlling input/output operations of a plurality of peripheral devices coupled to multiplexer means performed in response to user program instructions, said system further including memory means for storing said user program instructions, processor means for generating commands in response to said user instructions fetched from said memory means and means for interconnecting said memory means, said processor means and said multiplexer means for communication on a priority basis, said multiplexer means comprising:
   a plurality of registers arranged for storing data and control information transferred by said commands required for execution of said input/output operations by said multiplexer means;
   a first one of said registers connected to receive each of said commands; and,
   control means for controlling the operation of said multiplexer means in response to said commands and coupled to said registers, said control means including:
   signal generating means for generating signals, said generating means being coupled to different ones of said plurality of registers; and,
   decoding means coupled to said first register and to signal generating means, said decoding means being operative in response to each command coded to specify the loading of one of said registers specified by said each command which is designated as restricted to condition said generating means to generate an output signal for enabling the loading of said one register with information only when said command is coded to indicate that said loading specified by said command is permitted by said system.

2. The system of claim 1 wherein each of said commands includes a plurality of fields, each including at least one bit, a first of said fields coded to specify said load register operation and a second one of said fields including at least one bit coded to specify when said loading is restricted and wherein said generating means includes first gating means coupled to receive signals corresponding to said first and second fields, said gating means being conditioned by the states of said signals to generate said output signal for loading said one register in accordance with said first field only when said second field indicates that said loading is permitted.

3. The system of claim 2 wherein said generating means includes
second gating means coupled to receive signals from said first and second fields, said second gating means being conditioned by the states of said signals to generate a predetermined exception signal when said second field indicates that said loading is not permitted by said system.

4. The system of claim 3 wherein said multiplexer means further includes logic means coupled to said control means, said logic means including third gating means coupled to receive said exception signal, said third gating means being operative to produce a signal for generating an interrupt to said processor means.

5. The system of claim 4 wherein said multiplexer means further includes
status register means coupled to said second gating means, said predetermined exception signal conditioning said status register means for being switched to a predetermined state for designating the type of attempted unauthorized register loading.

6. The system of claim 2 wherein each said command includes first and second words, said first word including said plurality of fields and said second word including data to be loaded into said designated one register and wherein
said first one of said registers is connected to receive said first word from said processor means and a second one of said plurality of registers being connected to receive from said processor means said second word to be loaded into said designated one of said registers.

7. The system of claim 1 wherein said each of said commands includes a plurality of fields, a first one of said fields coded to specify a load register operation, a second one of said fields including a plurality of bits, each coded to specify restrictions for loading a corresponding number of different groups within said plurality of registers and a third one of said fields being coded to designate a register within one of said groups of registers and wherein said signal generating means includes a plurality of gating means, each one of said plurality of gating means coupled to receive signals corresponding to said first one of said fields and a different one of said plurality of bits of said second field, said each gating means being conditioned by the states of said signals to generate said output signal for loading said register specified by said third field in accordance with said first field only when the corresponding one of said plurality of bits indicates that said loading specified by said command is permitted.

8. The system of claim 7 wherein each of said plurality of gating means are coupled to receive signals corresponding to said third field and wherein said third field includes a number of bits coded to designate said different groups of registers to be loaded:
a first coded bit pattern of said number of bits designating a first group of registers for storing absolute memory addresses;
a second coded bit pattern of said number of bits designating a second group of registers for storing interrupt data used for interrupting said processor means;
a third coded bit pattern of said number of bits designating a third group of said registers for storing information used to facilitate the diagnosis of said multiplexer means; and,
a fourth coded bit pattern of said number of bits designating a fourth group of registers for storing information during the execution of said input/output operations.

9. The system of claim 8 wherein said memory means includes a plurality of memory locations, groups of said locations for storing instructions comprising different ones of a number of control routines and a number of device handler routines, a first one of said control routines for controlling said device handler routines and being arranged for conditioning said processor means for loading any one of said registers of said first group of restricted registers, a second one of said control routines for controlling input/output resources and being arranged to condition said processor means for loading any one of said registers of said second group of restricted registers, a third one of said control routines for controlling diagnosis of failures within said multiplexer means and being arranged to condition said processor means for loading any one of said registers of said third group of restricted registers and said device handler routines being arranged to condition said processor means for loading any one of said fourth group of unrestricted registers.

10. The system of claim 1 wherein said processor means includes:
a processor state register for storing information required for controlling the operation of a current routine being executed by said processor means, said information being coded to include indications of the restrictions associated with said current routine; and,
microprogrammed control means being responsive during the execution of each instruction in said routine specifying an input/output operation to generate signals in response to said indications for coding a corresponding one of said commands to indicate whether the loading operation specified by said routine is permitted by said system.

11. The system of claim 10 wherein said memory means includes a plurality of storage locations for storing groups of exception control blocks, each coded to include information to be loaded into said processor state register and information designating which one of a number of control routines to be referenced in responding to an exception condition associated therewith; and, said processor means including exception control means operative to detect said exception condition, said control means including:

a first register for storing a control block base address for said control blocks;

a second register for storing a constant designating the type of exception; and adder means connected to said first and second registers for combining said control base address with said constant to form an address specifying a specific one of said control blocks for processing said exception and for loading said processor state register with said indications of the restrictions associated with said control routine.

12. Multiplexer means for use in an input/output system for controlling the operations of a plurality of peripheral devices in response to instructions of a number of routines, said system further including a memory module for storing said routines, processor module including means for generating commands in response to said instructions and means for interconnecting said memory module, said processor module and said multiplexer means for communication, said multiplexer means comprising:

a plurality of registers for storing data and control information transferred to said multiplexer means by a plurality of load register commands, a first group of registers of said plurality of registers for storing memory addresses for referencing said memory means during data transfer operations;

a second group of registers of said plurality of registers for storing interrupt information used by said processor module;

one of said plurality of registers being connected to receive each of said commands; and, control means for controlling the operation of said multiplexer means, said control means being coupled to said first and second groups of registers, said control means including:

load control means for controlling the loading of said plurality of registers, said load control means being coupled to said first and second groups of registers; and, input logic means coupled to said one register and to said load control means, said logic means being operative in response to each command coded to specify the loading of one of said registers of said first and second groups designated by said each command to condition said load control means to generate an output signal for enabling the loading of said one register only when said command is coded to indicate that said loading specified by said command is permitted by said system.

13. The system of claim 12 wherein each of said load register commands includes a plurality of fields, each including at least one bit, a first of said fields coded to specify said load register operation, a second one of said fields including at least one bit coded to specify when said loading is restricted and a third one of said fields coded to specify a register of said groups to be loaded and wherein said load control means includes gating means coupled to receive signals corresponding to said first, second and third fields from said logic gating means, said gating means being conditioned by the states of said signals to generate said output signal for loading said one register of said groups specified by said third field in accordance with said first field only when said second field indicates that said loading by the routine is permitted.

14. The system of claim 13 wherein said load control means includes second gating means coupled to receive signals corresponding to said first, second and third fields, said second gating means being conditioned by the states of said signals to generate a predetermined exception signal when said second field indicates that said loading by said routine is not permitted by said system.

15. The system of claim 14 wherein said multiplexer means further includes logic means coupled to said control means, said logic means including third gating means coupled to receive said exception signal, said gating means being operative to produce a signal for generating an interrupt to said third processor means.

16. The system of claim 15 wherein said multiplexer means further includes status register means coupled to said second gating means, said predetermined exception signal conditioning said status register means for being switched to a predetermined state for designating the group of registers involved in the attempted unpermitted register loading by said routine.

17. The system of claim 14 wherein each said load register command includes first and second words, said first word including said plurality of fields and said second word including data to be loaded into said register of said groups designated by said third field and wherein said one register of said plurality of registers is connected to receive from said processor module said first word and a second one of said plurality of registers is connected to receive from said processor module said second word to be loaded into said designated register.

18. The system of claim 12 wherein said each of said load register commands includes a plurality of fields, a first one of said fields coded to specify said load register operation, a second one of said fields including a plurality of bits, each coded to specify restrictions for loading said groups of registers for said routines and a third one of said fields being coded to designate a register within one of said groups of registers and wherein said load generating includes a plurality of gating means, each one of said plurality of gating means coupled to receive signals corresponding to said first one of said fields and a different one of said plurality of bits of said second field, said each gating means being conditioned by the states of said signals to generate said output signal for loading said register specified by said third field in accordance with said first field only when the corresponding one of said plurality of bits indicates that said loading by said routine is permitted.

19. The system of claim 18 wherein said memory module includes a plurality of memory locations, groups of said locations for storing instructions comprising different ones of a number of control routines and a number of device handler routines, a first one of said control routines for controlling said device handler routines and being arranged for conditioning said processor module for loading any one of said registers of said first group of restricted registers, a second one of said control routines for controlling input/output resources and being arranged to condition said processor module for loading any one of said registers of said second group of restricted registers.

20. The system of claim 19 wherein said processor module includes:

a processor state register for storing information required for controlling the operation of a current routine being processed by said processor means, said information being coded to include indications of the restrictions associated with said current routine; and, microprogrammed control means being responsive during the execution of each instruction in said routine specifying an input/output operation to generate signals in response to said indications for coding a corresponding one of said commands to indicate whether said loading by said routine is permitted by said system.

21. The system of claim 20 wherein said memory module further includes a plurality of storage locations for storing groups of exception control blocks, each coded to include information to be loaded into said processor state register and information designating which one of said control routines are to be referenced in responding to an exception condition associated therewith; and, said processor module including exception control means operative to detect said exception condition, said control means including:

a first register for storing a control block base address for said control blocks;

a second register for storing a constant designating the type of exception; and adder means connected to said first and second registers for combining said control base address with said constant to form an address specifying a specific one of said control blocks for processing said exception and for loading said processor state register with said indications of the restrictions associated with said control routine.

22. In a data processing system having addressable memory module means for storing program instructions, processor module means for generating commands in response to said program instructions, said processor module means including control means for processing detected conditions using a number of control routines stored in said memory module, at least one input/output multiplexer module means having a plurality of ports coupled to a plurality of peripheral devices for processing event signals occurring during input/output operations executed in response to user program instructions and said memory module means and system interface means interconnected between each of said module means for establishing paths of communication between pairs of said module means, said multiplexer module means comprising:

a plurality of channel sections, each section being coupled to a different one of said ports, each of said channel sections including a number of registers arranged for storing data and control information transferred by said commands, generated in response to instructions for controlling the operation of said channel sections, required for execution of said input/output operations by said multiplexer module means;

first and second registers, said first register connected to receive each of said commands and said second register connected to receive the data to be transferred in accordance with said commands; and, control means for controlling the operation of said multiplexer module means, said control means being coupled to each of said registers, said control means including:

logic gating means for generating output signals, said logic gating means being coupled to different ones of said number of registers; and, input means coupled to said first register and to said logic gating means, said input means being operative in response to each command coded to specify the loading of one of said number of registers designated as restricted to condition said logic gating means to generate an output signal for enabling the loading of said one register of said number of registers only when each said command is coded to indicate that said loading is permitted by said system and to inhibit said logic gating means from generating said output signal when each said command is coded to indicate that said loading is required to be effected by one of said control routines in lieu of said instructions controlling one of said channel sections to ensure the security of the system.

23. The system of claim 22 wherein said each of said commands specifying storage of said data and control information correspond to load register commands, each load register command including a plurality of fields, a first one of said fields coded to specify a load register operation, a second one of said fields including a plurality of bits, each coded to specify system restrictions for loading a corresponding number of different groups within said number of registers and a third one of said fields being coded to designate a register within one of said groups of registers and wherein said logic gating means includes a plurality of gating means, each one of said plurality of gating means coupled to receive signals corresponding to said first one of said fields and a different one of said plurality of bits of said second field, said each gating means being conditioned by the states of said signals to generate said output signal for loading said register specified by said third field in accordance with said first field only when the corresponding one of said plurality of bits indicates that said loading is permitted, said each gating means including means for generating an exception signal when said corresponding one of said plurality of bits indicates that loading is not permitted to be used in referencing an appropriate one of said control routines.

24. The system of claim 23 wherein said processing module means includes:

a processor state register for storing information required for controlling the operation of a current routine being processed by said processor module means, said information being coded to include indications of the restriction attributes associated with said current routine; and, microprogammed control means being responsive during the execution of each instruction in said routine specifying an input/output operation to generate signals in response to said indications for coding a corresponding one of said commands to indicate whether the loading operation specified by said routine is permitted by said system.

25. The system of claim 24 wherein said memory module further includes a plurality of storage locations for storing groups of exception control blocks, each coded to include control information to be loaded into said processor state register and information designating said one of said control routines is to be referenced in responsing to an exception condition; and, said processor module means including exception control means operative to detect said exception condition, said control means including:
a first register for storing a control block base address for said control blocks;
a second register for storing a constant designating the type of exception; and,
adder means connected to said first and second register for combining said control base address with said constant to form an address specifying a specific one of said exception control blocks for processing said exception condition and for loading said processor state register with said indications of the restriction attributes associated with said control routine to perform said loading operation.

* * * * *

UNITED STATES PATENT OFFICE
CERTIFICATE OF CORRECTION

Patent No. 4,017,839                Dated April 12, 1977

Inventor(s) Jaime Calle & V. Michael Griswold

It is certified that error appears in the above-identified patent and that said Letters Patent are hereby corrected as shown below:

In the Abstract, line 23, delete "acceses" and insert --accesses--.

Column 46, line 15, after "said" (second occurrence), insert --third--.

Column 46, line 17, delete "third".

*Signed and Sealed this*

*Thirteenth* Day of *June 1978*

[SEAL]

Attest:

RUTH C. MASON
*Attesting Officer*

DONALD W. BANNER
*Commissioner of Patents and Trademarks*